US007954151B1

(12) United States Patent
Nisbet et al.

(10) Patent No.: US 7,954,151 B1
(45) Date of Patent: May 31, 2011

(54) PARTIAL DOCUMENT CONTENT MATCHING USING SECTIONAL ANALYSIS

(75) Inventors: James Donald Nisbet, Menlo Park, CA (US); James Christopher Wiese, Dublin, CA (US); David Alexander Reizes, Menlo Park, CA (US); Stephen Crosby Hoyt, Palo Alto, CA (US)

(73) Assignee: EMC Corporation, Hopkinton, MA (US)

( * ) Notice: Subject to any disclaimer, the term of this patent is extended or adjusted under 35 U.S.C. 154(b) by 1456 days.

(21) Appl. No.: 10/949,552

(22) Filed: Sep. 24, 2004

Related U.S. Application Data

(60) Provisional application No. 60/515,036, filed on Oct. 28, 2003.

(51) Int. Cl.
*G06F 11/00* (2006.01)
(52) U.S. Cl. .......................................... 726/22; 713/154
(58) Field of Classification Search ...................... 726/22
See application file for complete search history.

(56) References Cited

U.S. PATENT DOCUMENTS

| | | | |
|---|---|---|---|
| 5,159,667 A | 10/1992 | Borrey et al. | |
| 5,276,830 A | 1/1994 | Endo et al. | |
| 5,640,534 A | 6/1997 | Liu et al. | |
| 5,703,956 A | 12/1997 | Kim | |
| 5,832,470 A * | 11/1998 | Morita et al. | ...................... 707/1 |
| 5,864,683 A | 1/1999 | Boebert et al. | |
| 5,983,246 A * | 11/1999 | Takano | .......................... 715/223 |
| 5,991,709 A * | 11/1999 | Schoen | .............................. 704/1 |
| 6,011,848 A | 1/2000 | Kanda et al. | |
| 6,026,410 A * | 2/2000 | Allen et al. | ............................ 1/1 |
| 6,161,130 A * | 12/2000 | Horvitz et al. | ................ 709/206 |
| 6,262,976 B1 | 7/2001 | McNamara | |
| 6,295,092 B1 * | 9/2001 | Hullinger et al. | ............. 348/468 |
| 6,360,279 B1 | 3/2002 | Woods et al. | |
| 6,362,992 B1 | 3/2002 | Cheng | |
| 6,529,954 B1 * | 3/2003 | Cookmeyer et al. | .......... 709/224 |

(Continued)

FOREIGN PATENT DOCUMENTS

EP 466516 A2 * 1/1992

OTHER PUBLICATIONS

Excel Spreadsheet of Dec. 10, 2008 identifying references used to reject claims in related applications; 1 page.

(Continued)

*Primary Examiner* — Emmanuel L Moise
*Assistant Examiner* — Luu Pham
(74) *Attorney, Agent, or Firm* — Patent Ventures; Bennett Smith; Korbin Van Dyke

(57) ABSTRACT

Monitored content is classified to determine partial matches with fragments of documents. A set of redundant keys, or sliding sectional fingerprints, are computed for every possible alignment of the documents with respect to the monitored content. The keys are stored in repositories according to the classification of the corresponding documents. Sectional fingerprints are computed for the monitored content, and the repositories are searched. If a match is found in a repository corresponding to public content, then the monitored data section is classified as public. If a match is found only in a repository corresponding to private content, then the data section is classified as private. Otherwise, the data section is classified as unknown. In a related aspect, a set of policies are searched for a first match in part according to the classifications of the monitored data sections, and a designated action taken if the first match is found.

67 Claims, 14 Drawing Sheets

U.S. PATENT DOCUMENTS

| | | | |
|---|---|---|---|
| 6,631,496 B1* | 10/2003 | Li et al. | 715/200 |
| 6,643,652 B2 | 11/2003 | Helgeson et al. | |
| 6,678,250 B1 | 1/2004 | Grabelsky et al. | |
| 6,829,613 B1* | 12/2004 | Liddy | 707/694 |
| 6,889,210 B1* | 5/2005 | Vainstein | 705/57 |
| 6,990,496 B1* | 1/2006 | McGee et al. | 707/101 |
| 7,069,437 B2 | 6/2006 | Williams | |
| 7,089,246 B1 | 8/2006 | O'Laughlen | |
| 7,185,073 B1 | 2/2007 | Gai et al. | |
| 7,227,842 B1* | 6/2007 | Ji et al. | 370/235 |
| 7,346,921 B2 | 3/2008 | Murren et al. | |
| 2001/0042087 A1* | 11/2001 | Kephart et al. | 707/530 |
| 2002/0019817 A1* | 2/2002 | Matsui et al. | 707/1 |
| 2002/0022956 A1* | 2/2002 | Ukrainczyk et al. | 704/9 |
| 2002/0042923 A1* | 4/2002 | Asmussen et al. | 725/92 |
| 2002/0055998 A1* | 5/2002 | Riddle et al. | 709/224 |
| 2002/0087327 A1* | 7/2002 | Lee et al. | 704/270.1 |
| 2002/0099952 A1 | 7/2002 | Lambert et al. | |
| 2002/0100036 A1 | 7/2002 | Moshir et al. | |
| 2002/0129140 A1 | 9/2002 | Peled et al. | |
| 2003/0084134 A1 | 5/2003 | Pace et al. | |
| 2003/0105739 A1 | 6/2003 | Essafi et al. | |
| 2003/0149678 A1* | 8/2003 | Cook | 706/46 |
| 2003/0167279 A1* | 9/2003 | Smiga et al. | 707/102 |
| 2003/0220909 A1* | 11/2003 | Farrett | 707/3 |
| 2004/0001090 A1* | 1/2004 | Brown et al. | 345/752 |
| 2004/0083299 A1* | 4/2004 | Dietz et al. | 709/230 |
| 2004/0088361 A1 | 5/2004 | Statman | |
| 2004/0103404 A1 | 5/2004 | Naumovich et al. | |
| 2004/0151382 A1* | 8/2004 | Stellenberg et al. | 382/219 |
| 2005/0055399 A1 | 3/2005 | Savchuk | |
| 2005/0060535 A1* | 3/2005 | Bartas | 713/154 |
| 2005/0060643 A1* | 3/2005 | Glass et al. | 715/501.1 |
| 2005/0102536 A1 | 5/2005 | Patrick et al. | |
| 2005/0198493 A1 | 9/2005 | Bartas | |
| 2005/0256889 A1 | 11/2005 | McConnell | |
| 2008/0047018 A1 | 2/2008 | Baudoin et al. | |

OTHER PUBLICATIONS

Excel Spreadsheet of Dec. 26, 2008 identifying references used to reject claims in related applications; 1 page.

Table of Jun. 26, 2009 identifying references used to reject claims in related applications; 1 page.

* cited by examiner

PARTIAL DOCUMENT CONTENT MATCHING USING SECTIONAL ANALYSIS

CROSS REFERENCE TO RELATED APPLICATIONS

This application claims the benefit under 35 USC 119(e) to U.S. Provisional Application Ser. No. 60/515,036 entitled MONITORING AND PREVENTING THE TRANSMISSION OF SELECT DATA filed Oct. 28, 2003, which is incorporated herein by reference for all purposes. This application further incorporates by reference for all purposes: U.S. Pat. No. 7,516,492 B1 (Ser. No. 10/949,539), entitled INFERRING DOCUMENT AND CONTENT SENSITIVITY FROM PUBLIC ACCOUNT ACCESSIBILITY, filed herewith, and U.S. Pat. No. 7,523,301 B2 (Ser. No. 10/949,545), entitled INFERRING CONTENT SENSITIVITY FROM PARTIAL CONTENT MATCHING, also filed herewith.

FIELD

This invention is related to partial content matching to classify monitored data to enable flagging and optionally preventing electronic transmission of select data.

BACKGROUND

A corporate organization regularly employs the Internet to communicate with customers and vendors, to conduct research, and to perform various other tasks. The organization also creates and maintains confidential and sensitive information as part of the usual course of business. Even when the organization has policies in place to protect the transmission of sensitive or confidential information, there is no efficient way to monitor for compliance with these policies. Thus far it has proven difficult to prevent misuse or theft of valuable sensitive or proprietary information. Such information includes financial data, personal information, confidential documents, intellectual property, and customer lists.

Theft of proprietary information is one of the most costly security problem facing companies today. A recent study estimated that losses of proprietary information and intellectual property cost U.S. corporations in excess of $50 billion per year. New government regulations impose penalties for violations of customers' private medical, financial and personal information. Theft of financial data, customer lists and intellectual property can impact revenues, increase legal costs, and erode long-term competitive advantages.

One attempt to address this problem is the use of Access Control Lists (ACLs) to enable or disable access to a document based on user identification or privilege level. However, a user may be granted access to a document and then inappropriately e-mail the document to a non-privileged user outside the organization. In addition, the organization typically has a set of business processes and infrastructure in place and a solution is required which minimally impacts these.

Additional complexities arise when identifying sensitive material. For example, it is difficult to individually mark each one of potentially thousands of documents as safe for external release or prohibited from transmission. Furthermore, such properties may change over time, for example as in the case of a datasheet. Initially the information is closely guarded and proprietary, but may later be publicly released. After the public release, external transmission of the document is allowable.

Tracking information movement by filename or Universal Resource Locator (URL) is also limiting, as users may copy sensitive information into a location with a different identifier. What must be protected are the contents of these documents. Even if only a portion of the sensitive information is released, the organization could be exposed to significant consequences.

Existing content-based approaches include keyword or key-phrase matching. However, this often results in false positives, i.e. identifying information as sensitive when in reality it is public. Blanket solutions that completely block external transmission of sensitive material to all destinations may be overly restrictive, as the organization may have remote locations accessible only via Internet.

Existing access control systems define who can see sensitive information, but they cannot control where the information goes once access is granted. Most organizations have little visibility into the actual transmission of sensitive information, and whether that information leaves internal networks for the outside world.

What is needed is an invention that addresses these shortcomings of the current art.

DETAILED DESCRIPTION

Figure 1:
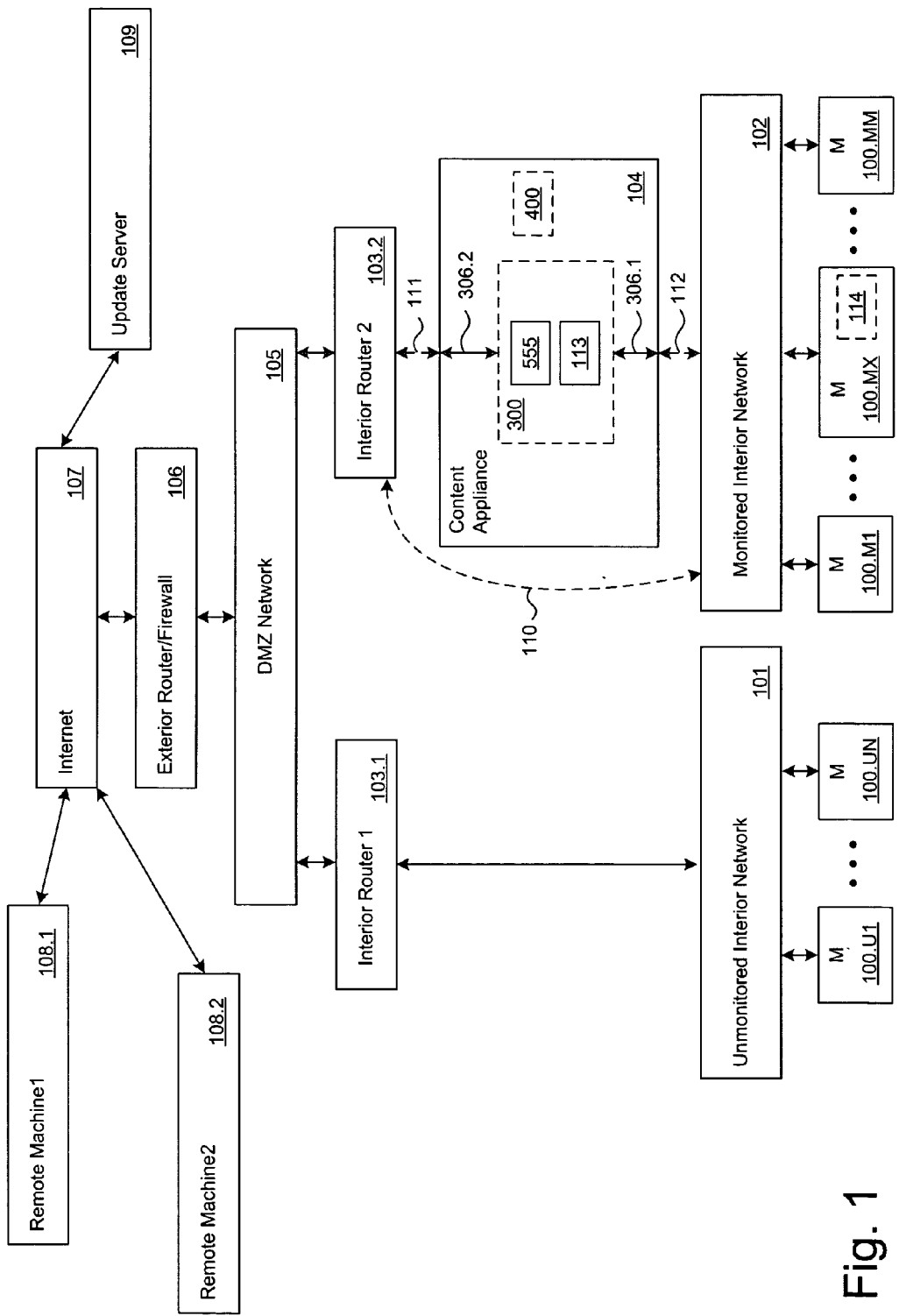
FIG. 1 is a block diagram illustrating a system embodiment including a content appliance.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

INTRODUCTION

One embodiment monitors the content of traffic to the Internet for violations of private content transmission policies, to protect against external transmission of the private information. The private content includes any sensitive or proprietary information, such as: financial data, personal information, confidential documents, intellectual property and customer lists. Another embodiment monitors the content of traffic to the Internet to quickly identify potential regulatory and privacy violations caused by external transmission of inappropriate information via the Internet. Another embodiment monitors the content of internal transmission of private data to detect possible internal abuses of private information. Detection of undesired transmission of private data content is not limited to recognizing communication of an entire document, as other embodiments provide for detecting transmission of excerpts of documents, such as a sentence, a paragraph, or a section.

Various embodiments include automatic and manual techniques for classifying documents as private or public. In one aspect, ACLs are used to classify potentially private source content material en-masse, automatically. In a related aspect, a lack of accessibility by a specified account (generally corresponding to a user account with few privileges) is used to classify private content. In another aspect, portions of a file system are specifically marked as containing private source content. In another aspect, portions of a file system are specifically marked as containing public content.

Various embodiments track private digital content whenever it is communicated on the internal network. Due to monitoring of content transmission, using a linguistic analysis, instead of document access, embodiments are enabled to detect a wide range of violations. For example, embodiments may detect and take a predetermined action if paragraphs from a future news release are found in an external email message, before the news is to be made publicly available. Later, after the news has been publicly released, these paragraphs may be sent externally without the need for detection and any subsequent predefined action.

More specifically, some embodiments determine if monitored content matches (using linguistic analysis) previously classified private and public content. If the monitored content matches neither, it is classified as unknown. If it matches only one classification, then it is classified according to the matching content. However, if the monitored content matches both public and private content, then the public classification overrides the private classification. Overriding private classification with public classification in this manner prevents classifying content as private if it is publicly released. In the example of the datasheet, before it was publicly released, it would exist only in documents that would be classified as private, and hence monitored content matching it would be flagged. However, after the datasheet was publicly released, it would also exist in documents that would be classified as public, and therefore monitored content matching it would not be flagged.

Another embodiment takes the form of an appliance inserted into an existing corporate network, without requiring changes to existing business processes. The appliance is installed at the perimeter of the corporate network, enabling effective content monitoring of all unencrypted outgoing network traffic. The appliance is provided with information about private and public documents. Matching linguistic criteria is extracted from the private and public documents and stored in a repository. Authorized (and unauthorized) content distribution policies are also provided to the appliance, for protecting the private documents from external exposure. Various embodiments track and log all exceptions to the authorized distribution policies, recording the exceptions in an audit log. Optional alerts may be configured to be sent from the appliance. An administrator may then browse the audit log to identify specific interactions that violate the authorized policies. Information in the audit log includes details of each violation, enabling further investigation of incidents and taking of other action (such as education or further notification).

Another embodiment is configured to protect an interior network perimeter of the corporate network, enabling content monitoring of network traffic between internal departments. Private documents created in a hardware engineering department may be protected from exposure to the marketing department, for example.

Another embodiment takes the form of software routines added to an existing router, firewall, or other similar internet appliance. This embodiment may also be included in a file server.

Various embodiments include a fast linguistic analysis engine, implemented in software in one embodiment, and implemented in a combination of software and hardware-assisted firmware in another embodiment. The fast linguistic analysis engine enables comparing transmitted content with previously identified private content at wire-speed, without the need to stall transmission.

A key repository is used by various embodiments to store information required to determine transmission of private content, without storing the underlying content. The stored information includes linguistic keys created by hash functions, but not the original content, thus preventing recreation of the original content from information in the repository.

Private data may be identified on the basis of one or more individual files, directories, or hierarchical trees, according to various embodiments. A drag and drop interface may be used to identify these files, directories, and trees. Private data may be identified manually or automatically.

The linguistic analysis engine, in conjunction with the key repository information, is enabled to detect partial transmission of private data, in addition to detecting transmission of an entire private document. For example, if a portion of a private document is copied into an e-mail message, the content can be detected when the e-mail is transmitted.

Policies for detection of transmission of private content may be defined to enable tracking and auditing communications, according to another aspect. Defined policies may combine a number of factors including but not limited to: content classification (i.e. private or public), source and destination network address ranges, and "To:" and "From:" fields of e-mails, or other similar trusted information identifying senders and recipients, and a required minimum amount of identified content. Factors can be combined to create arbitrary policies. For example, transmission of any private content to anywhere could be audited, or all communications with a known host or network, such as a competitor, could be audited.

According to another aspect, only violations according to defined audit policies are audited, reducing the volume of information to be inspected to determine overall compliance to corporate information policies. Audit information may be retained in an audit log, and inspection software enables sorting, arranging, and filtering audit log entries to identify particular problems or highlight problem areas. Audit entries may be expanded to include information identifying the context of the entry, including whether the match was full or partial, the identification of the private content, the time of the violation, and any other relevant information. Changes to policies are also logged in the audit log, and the audit log is protected from unrecorded changes or edits. This provides for tamper-resistant audit logging.

Multiple protocols may be monitored by various embodiments, including: HTTP, SMTP, POP-3, IMAP, and FTP. In addition, content may be extracted from multiple file formats, including: Microsoft Office applications (such as Word, Excel, Powerpoint, and the like), web content applications (such as HTML and XML), and standard document applications (such as Adobe PDF and plain text). These files may be recognized when embedded in compressed files (such as zip files), or e-mail attachments.

Illustrative Combinations

The following is a collection of paragraphs that tersely summarize illustrative systems and methods in accordance with the concepts taught herein. Each of the paragraphs highlights various combinations of features using an informal pseudo-claim format. These compressed descriptions are not meant to be mutually exclusive, exhaustive, or restrictive and embodiments are not limited to these highlighted combinations. As is discussed in more detail in the Conclusion section, the invention encompasses all possible modifications and variations within the scope of the issued claims, which are appended to the very end of the patent.

A method comprising: monitoring data during transmission; if the data is free of private content, then taking a first action; and if the data contains private content, then taking a second action. The foregoing method wherein the second action includes raising an alarm. The foregoing method wherein the second action includes preventing further transmission of the data. Any of the foregoing methods wherein the first action includes allowing further transmission of the data.

A method comprising: designating information as belonging to a public class or a private class; monitoring communication of data as monitored data; and determining when the monitored data includes content representing some portion of the information belonging to the private class. The foregoing method wherein the designating step includes: identifying a public access control; and categorizing the information as belonging to the public class if the information is marked with the public access control, and belonging to the private class otherwise. Any of the foregoing methods wherein the designating step includes: identifying a public user-id; and categorizing the information as belonging to the private class if the information is not accessible via the public user-id. Any of the foregoing methods wherein the content representing some portion of the information belonging to the private class includes content identical to some portion of the information belonging to the private class. Any of the foregoing methods wherein the content representing some portion of the information belonging to the private class includes content linguistically equivalent to some portion of the information belonging to the private class. Any of the foregoing methods further including preventing further communication of the data when the monitored data includes content representing some portion of the information belonging to the private class. Any of the foregoing methods further including providing an alarm when the monitored data includes content representing some portion of the information belonging to the private class.

A method comprising: computing a set of private sliding sectional fingerprints for a document belonging to a private class and storing the set of private sliding sectional fingerprints into a private repository; computing a set of public sliding sectional fingerprints for a document belonging to a public class and storing the set of public sliding sectional fingerprints into a public repository; capturing a session of monitored network traffic; computing a set of traffic sectional fingerprints for the monitored traffic; and for each member of the set of traffic sectional fingerprints searching the private repository for a matching private sliding sectional fingerprint equal to the member of the traffic sectional fingerprint set; searching the public repository for a matching public sliding sectional fingerprint equal to the member of the traffic sectional fingerprint set; and if the matching private sliding sectional fingerprint is found and the matching public sliding sectional fingerprint is found, then designating the member of the traffic sectional fingerprint set as belonging to class public.

System Operation

FIG. 1 is a block diagram showing a system embodiment including content appliance 104. In summary, the operation of the content appliance is configured by using selected capabilities of administrator software 114. Content is also classified using additional features of the administrator software, and the classification results are stored in repository 555 included in the content appliance. Content appliance 104 then monitors network traffic to detect violations of content transmission policies, optionally logging information to audit log 113.

Three embodiments are simultaneously illustrated in FIG. 1, a first embodiment having couplings 110 and 112 but lacking coupling 111, known as a passive configuration. A second embodiment having couplings 110 and 111 but lacking 112 is known as an alternate passive configuration. A third embodiment having couplings 111 and 112 but lacking 110 is known as an active configuration.

The system as illustrated includes a portion of the global internet 107 coupled to two remote machines 108.1 and 108.2, an update server 109, and exterior router/firewall 106. Communication to and from internet 107 is coupled to DMZ network 105 via exterior router/firewall 106. Interior routers 103.1 and 103.2 in turn couple this communication to unmonitored interior network 101 and monitored interior network 102, respectively. Interior router 103.2 typically includes additional firewall functionality.

In the passive configuration, coupling 110 provides a direct coupling between interior router 2 103.2 and monitored interior network 102 while in parallel coupling 112 provides a direct coupling between monitored interior network 102 and content appliance 104. Alternatively, in the alternative passive configuration, coupling 110 provides a direct coupling between interior router 2 103.2 and monitored interior network 102 while in parallel coupling 111 provides a direct coupling between interior router 2 103.2 and content appliance 104. In the active configuration, coupling 111 provides a direct coupling between interior router 2 103.2 and content appliance 104 while coupling 112 provides a direct coupling between monitored interior network 102 and content appliance 104.

Unmonitored interior network 101 is coupled to a group of local machines 100.U1 and 100.UN, while monitored interior network 102 is coupled to local machines 100.M1, 100.MX, and 100.MM. The ellipsis between 100.U1 and 100.UN in FIG. 1 indicate an arbitrary number (N) of local machines may be coupled to unmonitored interior network 101. Similarly the ellipsis between 100.M1 and 100.MM indicate an arbitrary number (M) of local machines may be coupled to monitored interior network 102. The local machine identified as 100.MX is one of these machines selected for illustrative purposes. These two groups are subsequently referred to collectively as 100.U* and 100.M*. As shown in FIG. 1, content appliance 104 is coupled to enable observation (the passive modes) or intervention (the active mode) with regard to network traffic on monitored interior network 102. However, the content appliance is ignorant of network traffic on unmonitored interior network 101.

Administrator software 114 is installed and executed on any of local machines 100.M*, as shown by dashed box 114 inside of local machine 100.MX. Operation and use of the administrator software is described in more detail below, but it is generally used to configure and view information on content appliance 104, including storing information about content classification in repository 555 included in hardware 300.

The administrator software may be used in three roles: administrator, auditor, and view-only. The administrator role allows for configuration of content appliance 104, but does not allow viewing the content of audited transactions. The auditor role does allow viewing the content of audited transactions. The view-only role does not allow configuration of the content appliance, and it does not allow viewing the content of audited transactions, but it does allow viewing selected audit information in audit log 113.

Operation of the appliance in the passive mode is as follows. Using content appliance hardware 300 to execute content appliance software 400, content appliance 104 monitors traffic originating from any of local machines 100.M* on monitored interior network 102, via coupling 112. The monitored traffic is examined to determine if any content is communicated outside monitored network 102 (for example to remote machine 108.1) in violation of any private information transmission policies. If such violating traffic is found, then content appliance 104 recognizes an audit event, and records appropriate information in audit log 113 included in hardware 300.

Operation in the alternate passive configuration is similar to the operation in the passive configuration, except interior router 2 103.2 is configured to replicate all traffic sent via coupling 110 to coupling 111, allowing content appliance 104 to examine and process the traffic appearing on monitored interior network 102, recognizing audit events if required, as in the passive configuration. In another illustrative scenario, interior router 2 103.2 may be configured to pass a subset of the traffic appearing on coupling 110 to coupling 111, as long as the subset includes all traffic requiring monitoring, i.e. to remote machine 108.1, as in the example.

In the active configuration content appliance 104 is in series between remote machine 108.1 and local machines 100.M*. Traffic arriving on coupling 112 and destined for remote machine 108.1 is examined and processed as in the passive configurations to detect information transmission policy violations. If no violations are detected, then content appliance 104 passes the traffic to coupling 111 for transmission to remote machine 108.1 via interior router 2 103.2, DMZ network 105, exterior router/firewall 106, and interne 107. If any violations are detected, then content appliance 104 does not pass the traffic to coupling 111. In this situation, content appliance 104 may also recognize an audit event as in the passive configurations. In an alternate illustrative scenario, content appliance 104 may pass violating traffic to coupling 111 instead of blocking it, but also recognize an audit event.

Those of ordinary skill in the art will recognize that partitioning administrator software 114 entirely to operate on 100.MX is arbitrary. For example, selected functions of the administrator software may instead be partitioned to operate on content appliance 104. In an exemplary embodiment the functions of the administrator software are implemented via a secure embedded web-server in the content appliance and are accessed by the administrator via a web-browser.

Those of ordinary skill in the art will also recognize many topological variations of systems employing content appliance 104 are possible. For example, DMZ network 105 may be implemented in multiple nets or not present at all. Similarly, monitored interior network 102 may be partitioned into several nets or subnets. These and other such variations are possible without departing from the spirit of the present invention.

Figure 2:
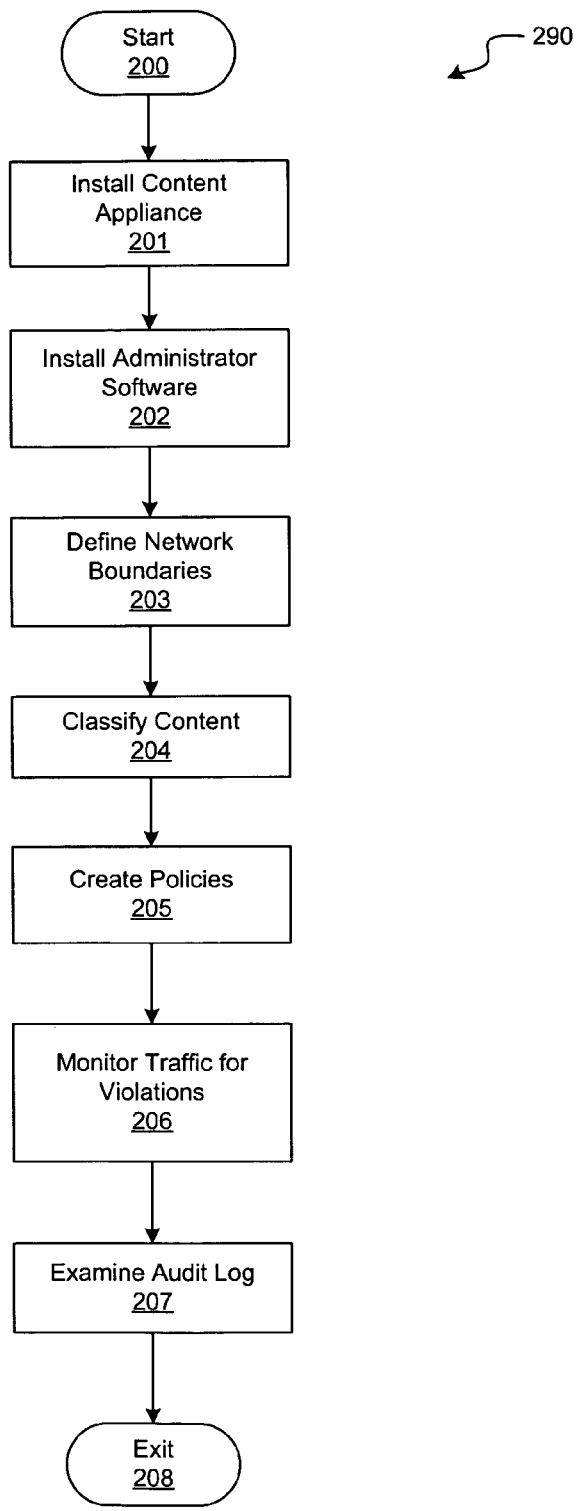
FIG. 2 is a conceptual flow diagram illustrating an embodiment of installation, configuration, and use of the content appliance.

FIG. 2, flow diagram 290, conceptually illustrates an embodiment of installation, configuration, and use of content appliance 104. Flow begins at "Start" box 200, and continues to box "Install Content Appliance" 201, where content appliance 104 is installed for monitoring traffic on monitored interior network 102, according to the passive, alternate passive, or active configuration as desired. Flow then continues to box "Install Administrator Software" 202, where administrator software 114 is installed on one of local machines 100.M* (for example, machine 100.MX as shown in FIG. 1). After the installation of the appliance and the administrator software, flow proceeds to box "Define Network Boundaries" 203, where an administrator, using the administrator role, defines network boundaries defining internal and external networks. Flow then proceeds to box "Classify Content" 204, where the administrator classifies content as public or private. Flow then continues to box "Create Policies" 205, where the administrator creates policies defining allowed content communication.

After completing configuration of the appliance (boxes 203, 204, and 205), the appliance is thus enabled and flow proceeds to box "Monitor Traffic for Violations" 206, where content appliance 104 monitors traffic for violations of the defined policies, logging violations in audit log 113 or blocking traffic as appropriate. Flow follows to box "Examine Audit Log" 207, where the administrator examines and inspects the audit log to determine compliance to the defined policies. Also in box 207, an auditor-user, using the auditor role of administrator software 114, may inspect the audit log and access the content associated with each logged event. Further in box 207, a view-only user, using the view-only role of the administrator software, may view only selected information from the audit log, but may not view any associated content. Flow is then completed and proceeds to "Exit" box 208.

"Defining Network Boundaries" (box 203) includes assigning network addresses (an IP address and a netmask, for example) and ports from which to collect data for monitoring. Optionally, protocol types may be associated with respective network addresses and ports, for subsequent use in determining traffic protocol. These assigned network addresses define the boundaries of monitored interior network 102. A setting of 0.0.0.0/0 forces monitoring of all network traffic observable by content appliance 104.

"Classifying Content" 204 is described in detail elsewhere (see Discovery Agent), but generally entails identifying content to be classified by location and class, and then processing the identified content in order to maintain classification information in repository 555. Example content classes include public, private, and unknown. The public class is generally used to designate content available for unrestricted distribution or use, while the private class is generally used to designate content having more restrictive use policies. Content not belonging to either the public class or the private class is considered unknown.

"Creating Policies" 205 includes defining an ordered set of traffic classification, session, and protocol attribute combinations, or polices, that are audited by content appliance 104. Activation of these policies in turn results in creating an audit log entry or preventing further transmission, for example. The defined policies are evaluated in the order specified, and when a matching policy is found for a given transaction, any remaining policies are ignored, resulting in an effective prioritization across multiple policies. A default policy is to audit when an attempt is made to transmit private data from any internal network to any external network.

Policies may be defined according to a number of factors, and these factors may be combined to create arbitrary policies. The factors include: transmission protocol (any of HTTP, SMTP, FTP, IMAP, POP3, and "any"), a source IP address range and netmask (or source CIDR specification), a source port range, a destination IP address range and netmask (or destination CIDR specification), a destination port range, a content class (any of public, private, and unknown), a required minimum amount of identified content, and an action (either audit or allow). Policies including e-mail protocols may also include "From:" and "To:" fields as part of the matching criteria. IP addresses may be supplied by DNS lookup using the associated domain name (http://www.domain.com, for example), or by dotted decimal representation (66.218.71.198, for example). In an illustrative embodiment only IP addresses are used for HTTP and FTP, while e-mail addresses with unresolved domain names are used with SMTP, IMAP and POP3. Those of ordinary skill in the art will recognize that in general a more fully orthogonal feature set may be implemented.

Each policy also specifies what action to take when the associated audit event is recognized. For example, the audit action specification may specify recording the transaction in audit log 113, blocking the transaction (in the active configuration only), or both. Notifications of audit actions may also be provided to a specified e-mail address, according to a specified time interval (such as immediately, every minute, every hour, and so forth). The notifications may be specified to provide selected information about audit actions, including the associated IP address or the domain name.

In a first illustrative scenario of policies defined in 205, a first policy may audit all e-mails to a competitor, and a second policy may audit all e-mails with private content to any external e-mail address. In a second illustrative scenario, a first policy may allow all e-mails from a CEO e-mail account to anyone, and a second policy may audit all other e-mails with private content. In a third illustrative scenario, a first policy may audit all FTP transfers to competitors, irrespective of content classification, a second policy may audit all HTTP transfers to competitors, also irrespective of content classification, and a third policy may audit all e-mails with private content to external addresses. Specifically in the context of FIG. 1, in a fourth illustrative scenario, all e-mail to remote machine1 108.1 would be prohibited; while all e-mail to remote machine2 108.2 would be allowed but reported. In a fifth illustrative scenario, all content classified as private would not be allowed to pass from monitored interior network 102 to interior router 2 103.2, or would be allowed but would also be reported by content appliance 104.

Conflicting policies defined in 205 are reported to the administrator, and may be corrected interactively. Policies allowing private content also allow public and unknown content. Policies auditing unknown content also audit public and private content. If there are no policies defined by the administrator, then all transactions are audited.

Policies may be tested with simulated transmissions, and the resultant action (allow or audit) indicated. Policies may also be imported or exported using an XML-based policy file, to enable archiving and restoring, and to provide for configuring multiple content appliances identically.

"Monitoring Traffic for Violations" 206 is described in detail elsewhere (see Monitoring Traffic). Briefly, it entails capturing network traffic based on the network boundaries defined in 203, classifying the captured traffic according to content class information stored in repository 555, and processing audit events as defined by Creating Policies 205. The processing of audit events may include recording transaction information in audit log 113.

Audit log 113 includes a plurality of entries, each entry including the following information: date/time of the audit, policy that triggered the audit, client name, client IP address, client port, client MAC address, server name, server IP address, server port, server MAC address, protocol used, and content class. The client name is determined at the time of the entry creation by a reverse look-up of the client IP address. Storing the client name and client MAC address in the entry provide for more efficient audit log interpretation in dynamic network address contexts, such as scenarios involving DHCP. "Examine Audit Log" 207 includes accessing functions available from administrator software 114 to view and analyze information stored in the audit log. This includes sorting, filtering, arranging, and otherwise displaying information in the audit log. The data in the audit log is stored in an encrypted format, and is accessible only when an auditor-user has logged into administrator software 114 in the auditor role. The audit log may also be exported and cleared. Alterations to policies as performed in "Create Policies" 205 are also recorded in audit log 113.

While flow diagram 290 is shown as a sequence of operations in this illustrative scenario, in other illustrative scenarios the flow may include branching. For example, flow may pass to any of "Define Network Boundaries" 203, "Classify Content" 204, "Create Policies" 205, or "Monitor Traffic for Violations" 206 from "Examine Audit Log" 207 or from "Monitor Traffic for Violations" 206. Alternatively flow may pass from "Create Policies" 205 back to "Classify Content" 204. Those of ordinary skill in the art will recognize other alternative flows that do not depart from the spirit of the present invention.

Content Appliance

Figure 3:
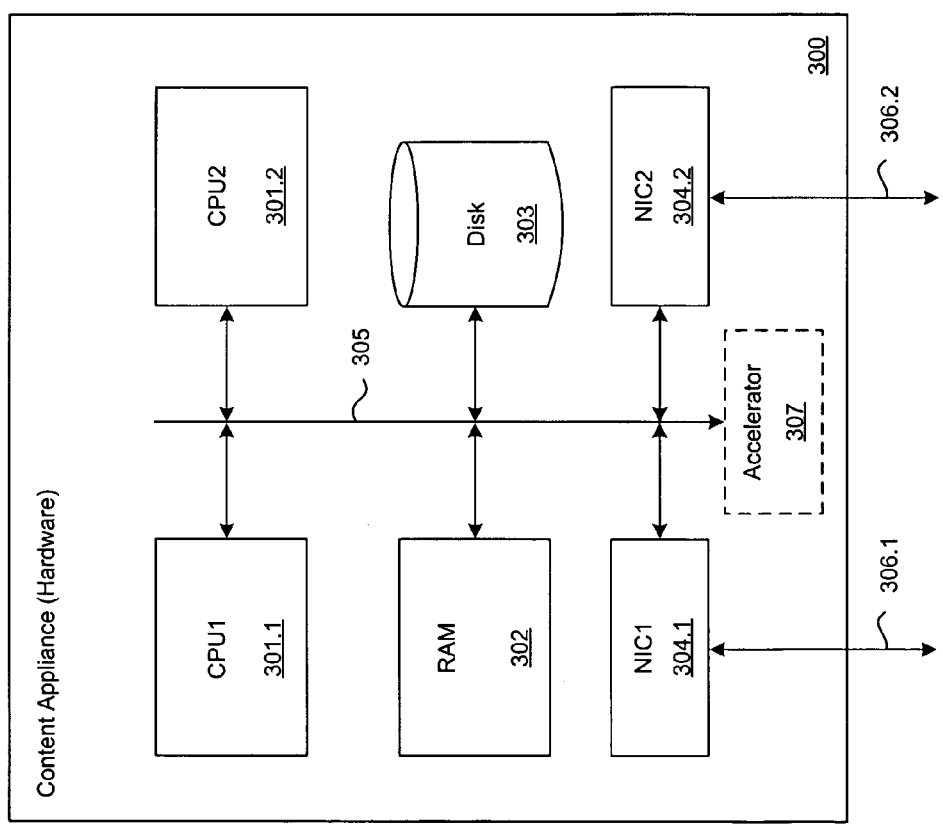
FIG. 3 is a block diagram illustrating a hardware view of an embodiment of the content appliance.

FIG. 3 is a block diagram illustrating a hardware view of an embodiment 300 of content appliance 104. Content appliance 104 includes a hardened Linux platform having a pair of central processing units, CPU1 301.1 and CPU2 301.2, for executing software to implement various functions of the appliance. The processors use shared RAM 302 and disk 303 as resources for program storage and execution. A pair of network interface circuits 304.1 and 304.2 is configured for communication on standard local area networks (LANs), such as 10M, 100M, or 1G data-rate Ethernet compatible networks. These are used by the appliance to communicate and to monitor communication via one or more LANs coupled to the appliance externally. Bus 305 enables communication between the components of content appliance 104. The content appliance may also optionally include accelerator hardware 307 for improving the performance or efficiency of execution of certain tasks.

Those of ordinary skill in the art will recognize that the configuration of components in content appliance 104 is only an illustrative embodiment, as many other configurations are possible without departing from the spirit of the present invention. For example, the number of processors or network connections may be varied, the quantity and interconnection of RAM and disk resources may be altered, and the communication enabled by bus 305 may be implemented in a variety of manners.

As indicated in FIG. 1, in the passive mode configuration, 306.1 is coupled via 112 to monitored interior network 102, while 306.2 is unused. In the alternate passive configuration 306.2 is coupled via 111 to interior router2 103.2 while 306.1 is unused. In the active configuration 306.2 is coupled via 111 to interior router2 103.2, and 306.1 is coupled via 112 to interior network 102. Note that 306.1 and 306.2 are typically equivalent in capability, and may be used interchangeably.

Figure 4:
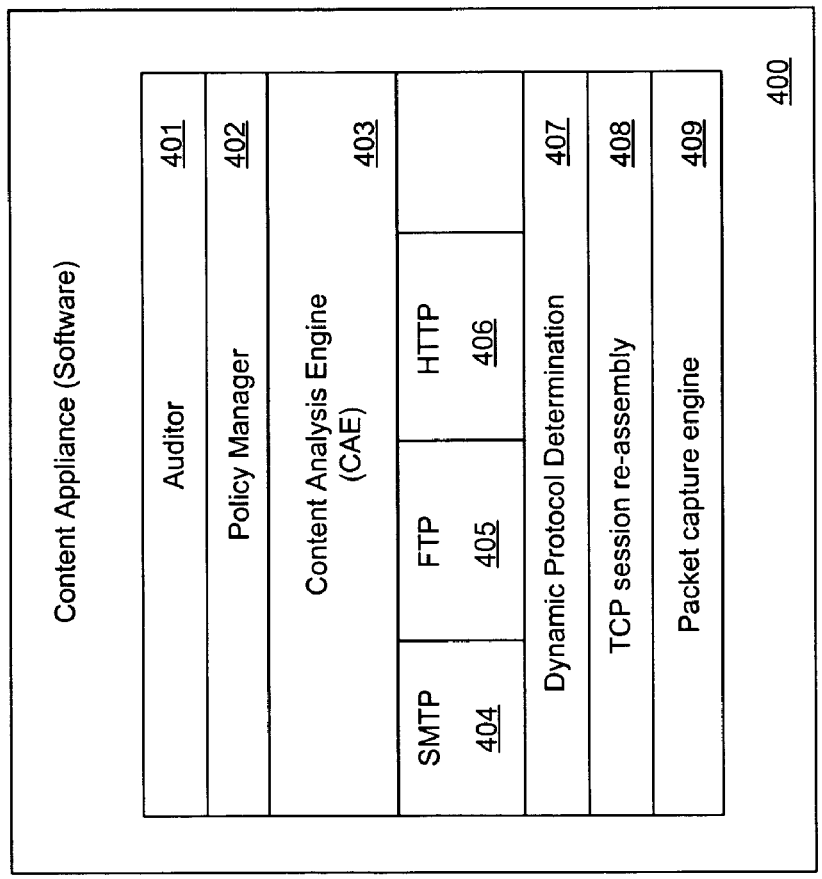
FIG. 4 is a block diagram illustrating a software view of an embodiment of the content appliance.

FIG. 4 is a block diagram illustrating a software view of an embodiment 400 of content appliance 104. Content appliance software 400, in conjunction with operating system routines (not shown), is executed by the resources of content appliance hardware 300. The software includes several functions, including auditor software 401, policy manager software 402, content analysis engine software (CAE) 403, dynamic protocol determination software 407, TCP session re-assembly software 408, packet capture engine software 409, and protocol software SMTP 404, FTP 405, and HTTP 406.

The overall task of content appliance software 400 is to provide support for managing and configuring the capabilities of content appliance 104, as well as implementing the functions of the appliance using content appliance hardware 300. Those functions include capturing and analyzing monitored traffic to determine if any defined information transmission policies are violated and if so, to take appropriate action.

Packet information provided by NIC1 304.1 and NIC2 304.2 is captured by packet capture engine software 409, and examined to determine the protocol associated with the packet (for example SMTP, FTP, or HTTP) by dynamic protocol determination software 407. Packets are re-assembled, according to the determined protocol and the TCP session state, into ordered flow data streams by TCP session re-assembly software 408 using an appropriately selected protocol software (including but not limited to one of SMTP 404, FTP 405, and HTTP 406).

Each of the ordered flow data streams produced by TCP session re-assembly software 408 is processed by CAE 403 as new data arrives, to classify the new data as public, private, or unknown. Policy manager software 402 then uses this information to determine if there is a match with a defined policy, and if so takes the action defined by the policy: allow or audit. Audit information is received by auditor software 401 and recorded in audit log 113 appropriately.

According to various embodiments, an update server 109 may be provided as a source of improved software routines for downloading into content appliance 104. In this mode of operation, in response to either an explicit request, or to an automatically recognized need for an upgrade, the content appliance requests a download from the update server 109 to provide patches or other modifications to any portion of content appliance software 400. This procedure may be used during a factory build of content appliance 104, or after installation of the content appliance at a customer site, allowing on-going refinements and improvements to the operational features and efficiency of the content appliance.

As will be recognized by those of ordinary skill in the art, the functions implemented collectively by the hardware 300 and software 400 of content appliance 104 may be partitioned in any number of ways between hardware and software. In the embodiment just described, relatively general hardware is utilized to perform processing according to software routines interfacing in a common manner with the hardware. However, functions of selected portions of software 400 may be partitioned to execute in specialized acceleration hardware included in content appliance hardware 300, as shown by optional hardware accelerator 307 in FIG. 3. Hardware accelerator 307 may be any combination of hard-wired, microcoded, or firmware implemented modules, and included in any combination of FPGA, ASIC, or custom integrated circuits.

Discovery Agent

Figure 5A:
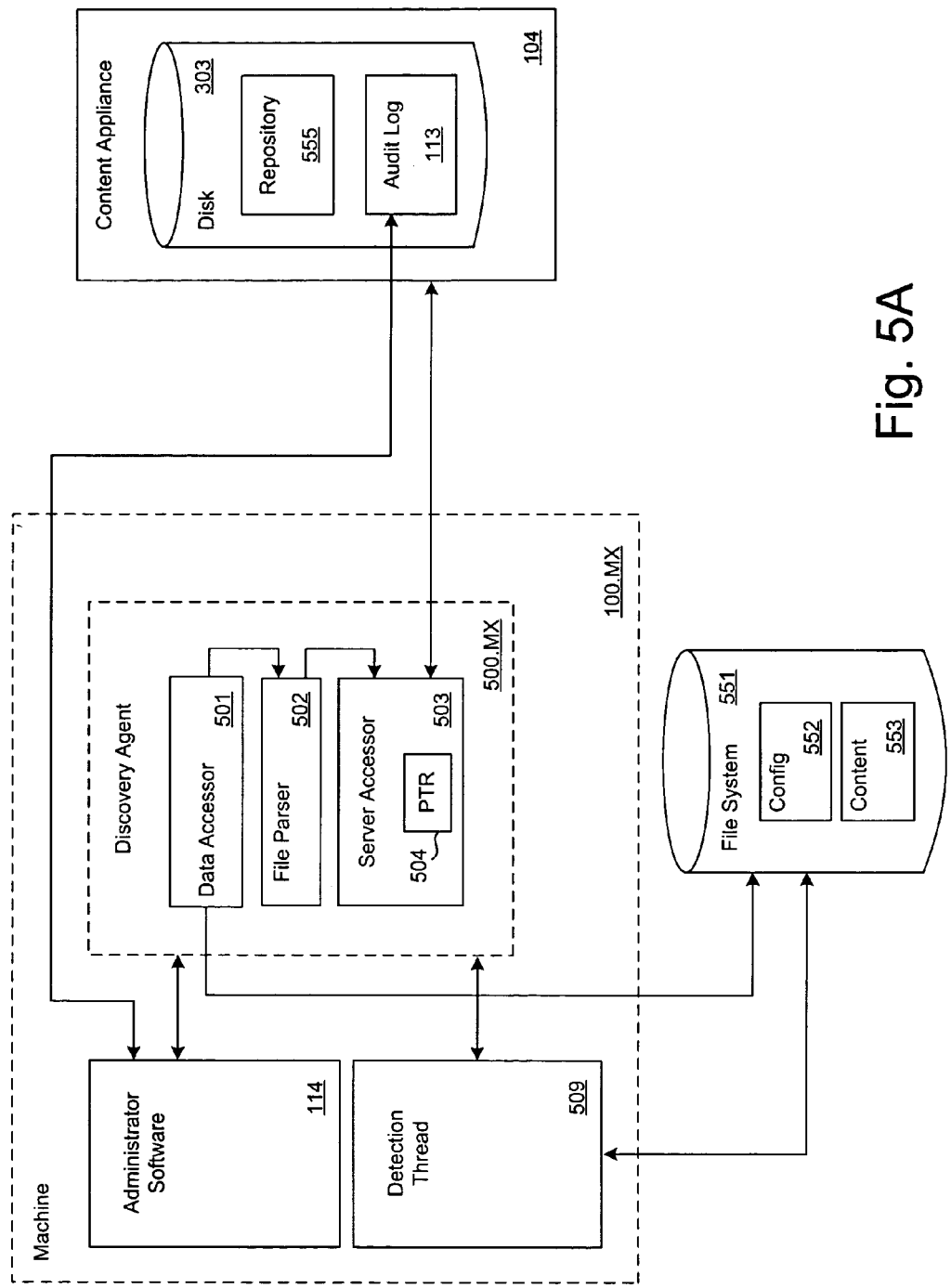
FIG. 5A is a conceptual illustration of an embodiment of an operation of administrator software and discovery agent software in a system context including the content appliance.

FIG. 5A is a conceptual illustration of the discovery agent software 500.MX in a system context including portions of content appliance 104. Discovery agent software 500.MX is responsible for classifying content 553 as private or public, and storing the results of the classification into repository 555, for later access during monitoring of traffic by content appliance 104. Discovery agent software 500.MX is executed as needed to perform functions specified by the administrator. Discovery agent software 500.MX in a first embodiment is a common library function that is called by the administrator software. In a second embodiment it is a thread or daemon that is spawned by the administrator software. The discovery agent executes on a predetermined one of the M local machines (as indicated by the identifier 100.MX) with sufficient permissions to list files in the directories of content 553 included in file system 551, and to read each of the listed files. Classifying content involves two activities: (1) identifying content to be classified, including specifying a collection of documents and designating the class of each document in the collection; and (2) processing the identified content and storing resultant classification data into the repository.

Administrator software 114, executing on local machine 100.MX, enables the administrator to specify an explicit collection of documents for classification as a collection of files, directories, and URLs using a drag-and-drop or file-listing interface. In a manual illustrative scenario the content classification process is directly driven by the administrator starting with this explicit collection. Designating the class of each document may also be performed explicitly by the administrator, a single file or tree at a time, or multiple files or trees using wildcards. For example, the administrator may designate all files in the tree C:\documents\public as class public, and all files in the tree C:\documents\private as class private. In the manual scenario documents in these two trees are processed by discovery agent software 500.MX one time at the explicit request of the administrator, and the resultant classification information stored in repository 555. No further changes are made to the repository without further administrator intervention.

In an automatic illustrative scenario the content classification process begins as above, with the administrator specifying an initial collection of documents for classification (files, directories, and URLs) as content 553. However, the administrator also enables an active discovery function, whereby discovery agent software 500.MX periodically scans the collection for changes to existing content, including modifications, additions, and deletions. When changes are noted, the changed content is processed and repository 555 modified accordingly. As in the manual scenario, designating the class of each document may be performed explicitly by the administrator.

In a notify illustrative scenario, rather than scanning for changes to existing content as in the automatic illustrative scenario, discovery agent software 500.MX receives notification from file system software associated with file system 551 that there have been changes to content 553. Discovery agent software 500.MX in turn processes the changed content and modifies repository 555 accordingly, as in the automatic illustrative scenario. As in the manual and automatic scenarios, designating the class of each document may be performed explicitly by the administrator.

In another embodiment, rather than explicitly designating the class of a document, the class may be automatically inferred from certain attributes of the document. In a first illustrative scenario, discovery agent software 500.MX may spawn detection thread (or daemon) 509, setting the user identity of the thread to "public user" (generally corresponding to a user account with few privileges, and defined previously using administrator software 114). Detection thread 509 attempts to access each document as it is classified, and when not successful in the access, the document is considered private. If the "public user" successfully reads the file based on the underlying ACL then the file is considered public, and considered private otherwise.

In a second illustrative scenario, the discovery agent may examine file protection or ACL information available from a directory listing status. If the ACL for a file matches the "public user", then the file is considered public, and considered private otherwise.

In some embodiments, only private documents are processed, so that there is no publicly classified content, and policies are defined accordingly. For example, such policies would flag external transmission of any private content, without any effective public content override. In other embodiments, only public documents are processed, so that there is no privately classified content. Associated policies would flag transmission of any content except public content.

Discovery agent software 500.MX includes three modules: data accessor 501, file parser 502, and server accessor 503. In the manual illustrative scenario, data accessor 501 locates specific documents to be classified according to information provided by the administrator via administrator software 114, accesses the documents, and passes the information to file parser 502. In the automatic illustrative scenario, data accessor 501 performs the active discovery function, periodically scanning the specified collection to determine when existing documents are modified, new documents are added, or existing documents are removed. Modified and new documents are accessed and passed to file parser 502, while removed document filenames are passed to the file parser. Similarly, in the notify illustrative scenario, data accessor 501 receives change notification information and processes modified, new, and removed documents as in the automatic illustrative scenario. In the automatic and notify illustrative scenarios, data accessor 501 may allow a minimum settling time between when a change is detected and when the changed document is processed, to allow the changed document to reach a steady state.

File parser 502 receives the content and the class for each document from data accessor 501. It first searches the content for embedded URLs pointing to additional content to be processed. In one illustrative scenario, only generic HTML pages are parsed in this manner, and only URLs pointing to additional contents on file system 551 are recognized. In another illustrative scenario, the administrator uses a web-copying program to copy non-local web content to a local directory, and then the local directory and its contents are processed according to the previous scenario.

After resolving any embedded URLs, the content of each document is linguistically analyzed and hashed, resulting in a set of "keys". This computation is described elsewhere (see Key Computation). For each document a file number (or file identifier) with a unique mapping to the document filename (or equivalent) is assigned, and information concerning the assignment is retained for later use to unambiguously identify the document. Finally, the keys, the file number, and the class of the document are passed to server accessor 503.

Server accessor 503 accesses repository 555 included in content appliance 104 via repository pointer 504. The key and file number are stored by class in the repository. Repository pointer 504 is initialized at start-up from information in configuration information 552, and includes the IP address of content appliance 104 and the filename of the repository.

Those of ordinary skill in the art will recognize that partitioning discovery agent software 500.MX entirely to operate on local machine 100.MX is arbitrary, and that selected functions of the discovery agent software may instead be partitioned to operate on content appliance 104. In an alternate embodiment, the key computation operations performed by file parser 502 (operating on the local machine) would instead be performed on content appliance 104. In this embodiment content to be classified would be passed to the content appliance via a secure channel, instead of clear channel communication of keys. Content appliance 104 would then be responsible for computing key information and directly storing it in repository 555.

Figure 5B:
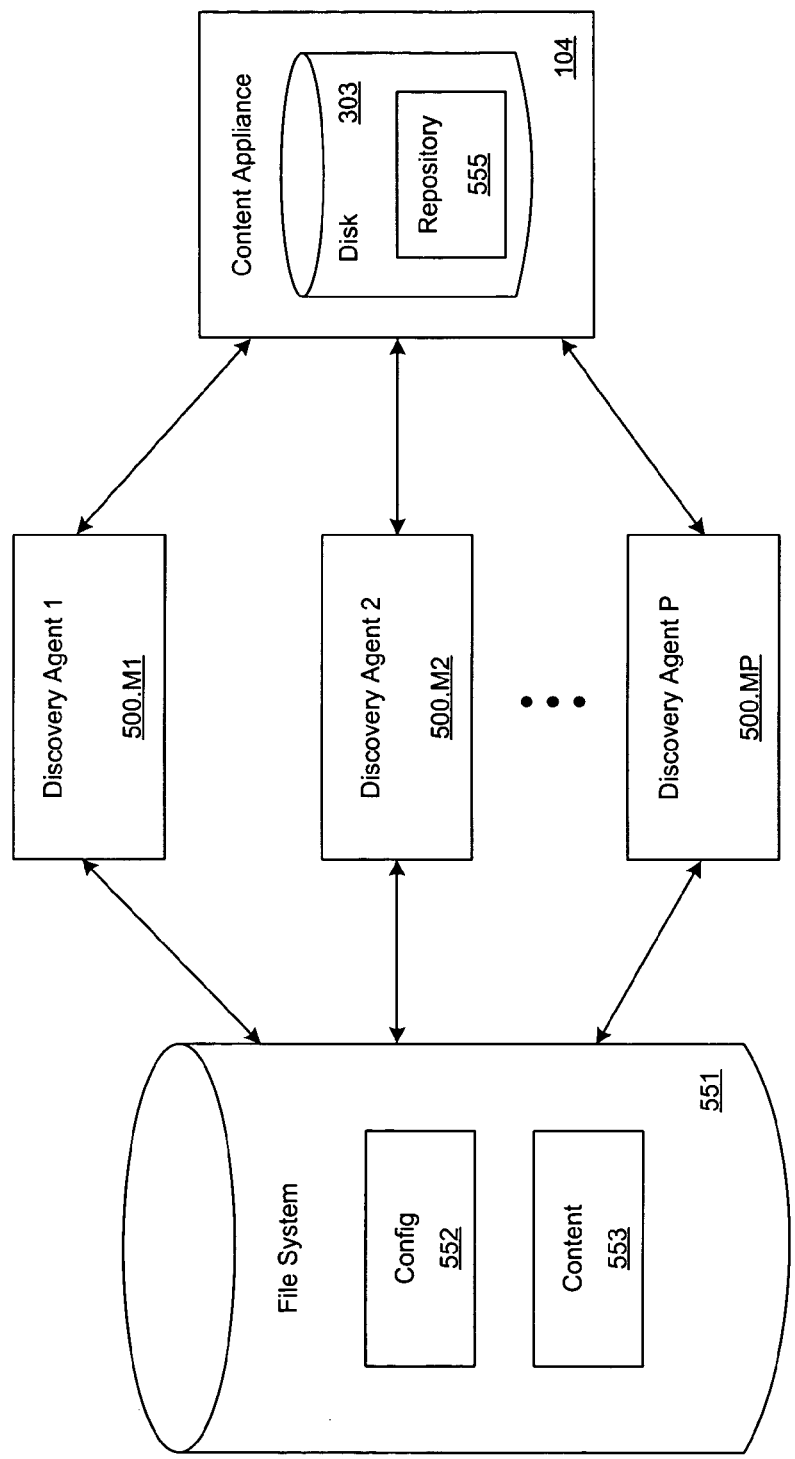
FIG. 5B is a conceptual diagram illustrating an embodiment of multiple instances of the discovery agent software.

FIG. 5B is a conceptual diagram illustrating an embodiment of multiple instances of discovery agent software 500.MX. The administrator, using administrator software 114, may configure multiple instances of discovery agent software 500.MX to operate in parallel, shown in the figure as discovery agent 1 500.M1, discovery agent 2 500.M2, and discovery agent P 500.MP. The agents are all initialized from configuration information 552, and collectively manage key and file number storage in repository 555. The agents may be executed on any of local machines 100.M*, and may be configured to statically or dynamically share operational work between them for more balanced loading. Further, those of ordinary skill in the art will recognize that content 553 may reside distributed amongst file systems across any of local machines 100.M*.

Repository

Figure 6A:
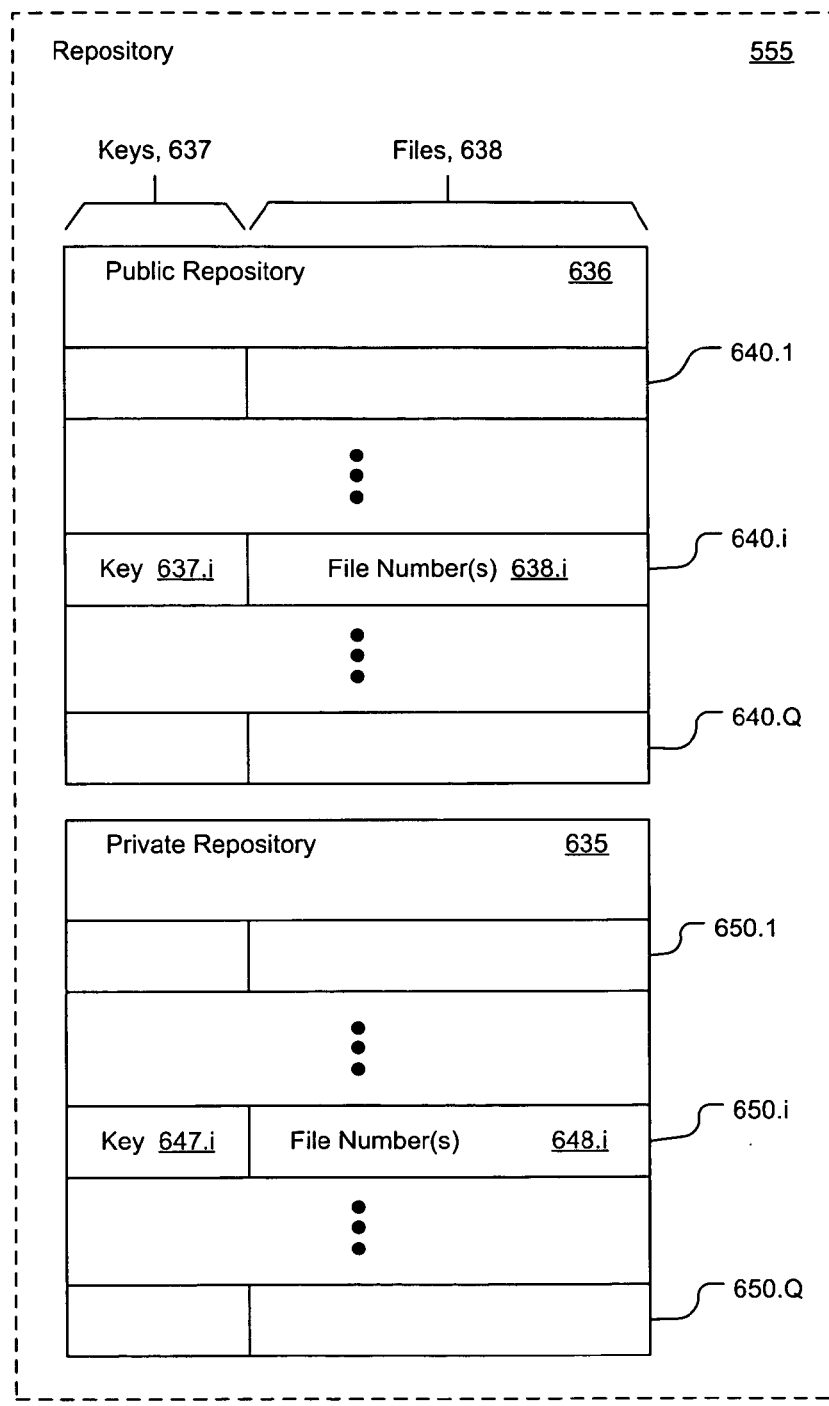
FIG. 6A illustrates selected details of an embodiment of a key and file number repository.

FIG. 6A illustrates selected details of an embodiment of key and filename storage in repository 555. The repository includes keys stored according to class. Public-content identification repository (a.k.a. public repository) 636 includes keys produced from documents classified as public, while private-content identification repository (a.k.a. private repository) 635 includes keys produced from documents classified as private. Public repository 636 is shown having Q entries (640.1, . . . , 640.*i*, . . . , and 640.Q). Each entry includes a key value field (637.*i* for example) and a file number field (638.*i* for example). Private repository 635 is arranged in a similar fashion and is also shown having Q entries (650.1, ..., 650.*i*, ..., and 650.Q). Each entry includes a key value field (647.*i* for example) and a file number field (648.*i* for example). While public repository 636 and private repository 635 are illustrated as having the same number of entries, in operation the number of entries in each portion of repository 555 varies dynamically, as is understood by those of ordinary skill in the art.

The entries of public repository 636 and private repository 635 may also be considered as arranged in two columns, shown in FIG. 6A as key value column 637 and file number column 638.

Figure 6B:
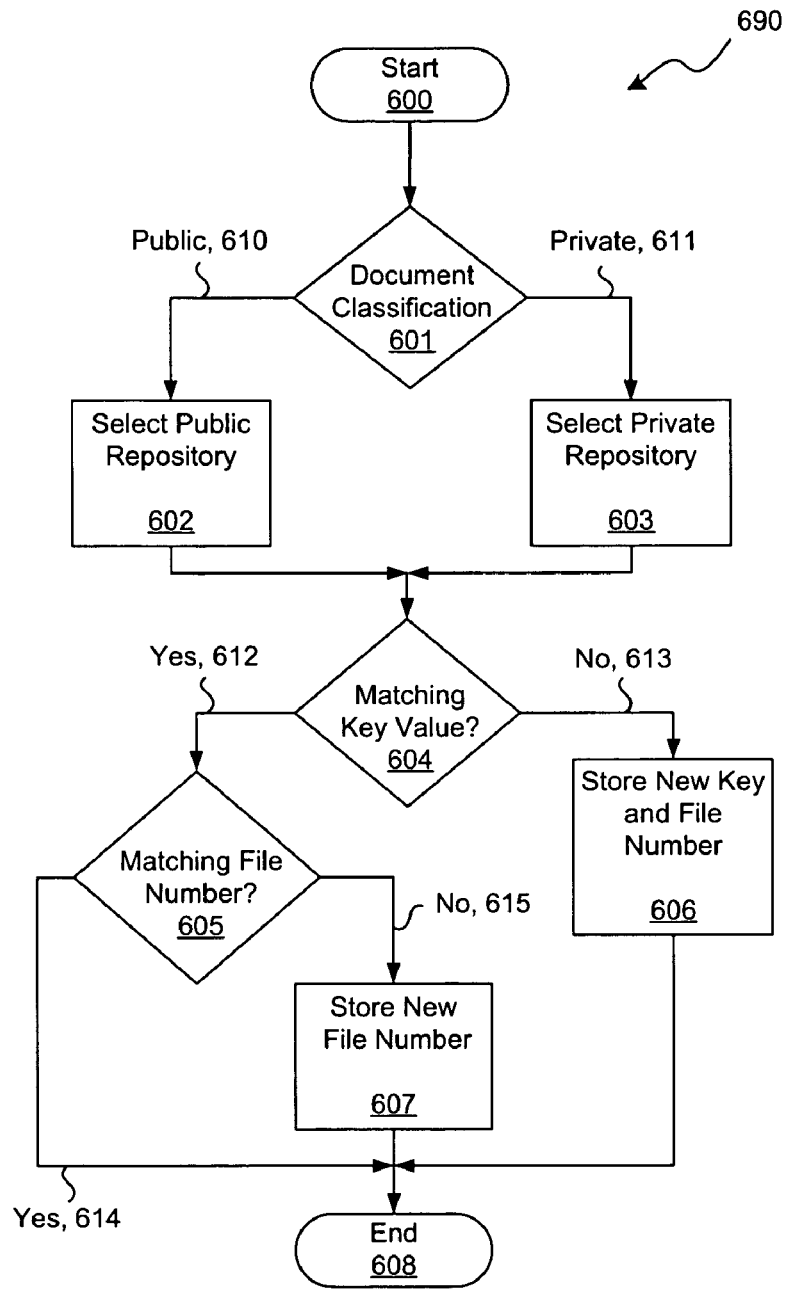
FIG. 6B is a conceptual flow diagram illustrating selected details of an embodiment of processing a new document with respect to a repository.

FIG. 6B, new document flow diagram 690, illustrates selected details of an embodiment of processing a new document with respect to repository 555. Initially repository 555 is empty; i.e. there are no keys stored in public repository 636 or private repository 635. Server accessor 503 incrementally manages information in the repository depending on whether a document is new, removed, or modified. A new document is processed in the following manner. For each key provided by file parser 502, processing begins at "Start" box 600. Subsequently the appropriate repository portion according to class (public repository 636 for the public class and private repository 635 for the private class) is selected. This is illustrated as "Document Classification" test 601, proceeding along path "Public" 610 for public class and "Select Public Repository" 602 (corresponding to public repository 636). Path "Private" 611 and "Select Private Repository" 603 correspond to private repository 635. The selected repository portion is then searched for a matching key in key value column 637, as shown by "Matching Key Value?" test 604. If a match is not found, then a new key entry is stored in the selected repository portion, including the key value and file number. This is illustrated by path "No" path 613 and "Store New Key and File Number" 606. If a match is found (for example entry 640.*i* in the public repository), then the file number is compared with the file numbers previously stored in the matching entry (638.*i* in this example). This is illustrated by path "Yes" 612 and "Matching File Number?" test 605. If a match is found (path "Yes" 614), then no further action is taken and flow proceeds to "End" box 608. If a match is not found (path "No" 615), then the file number is added to the list of file numbers previously stored in the matching entry ("Store New File Number" 607), and flow proceeds to "End" box 608.

Figure 6C:
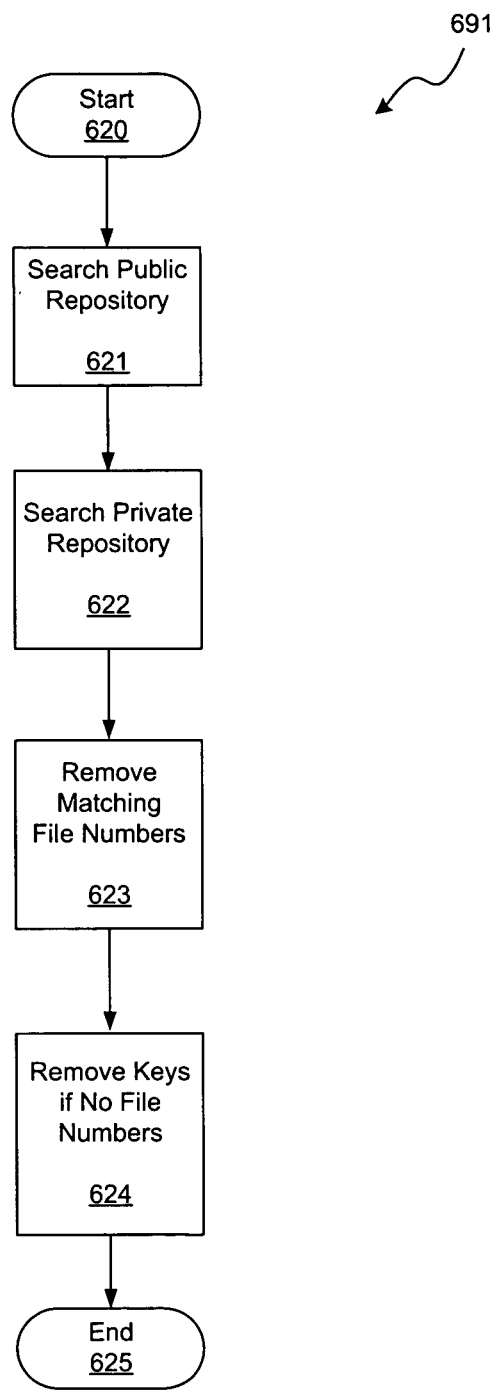
FIG. 6C is a conceptual flow diagram illustrating selected details of an embodiment of processing a removed document with respect to a repository.

FIG. 6C, remove document flow diagram 691, illustrates selected details of an embodiment of processing a removed document with respect to repository 555. A removed document is processed by file number starting with "Start" 620. Public repository 636 and private repository 635 are searched for any entries having the file number of the removed document included in file number column 638 ("Search Public Repository" 621 and "Search Private Repository" 622). The matching file number is removed from all entries where it is found ("Remove Matching File Numbers" 623). Subsequently, any entries having no remaining file numbers are removed completely from the associated repository ("Remove Keys if No File Numbers" 624). In other words, when the last document corresponding to a given key is removed, then the key is also removed from the repository. Processing for the respective file number is then complete at "End" box 625.

A modified document is processed first by removing it from the repository by file number, as discussed above, and then adding it back to the repository as a new document, using the keys produced by file parser 502.

Key Computation

Figure 7:
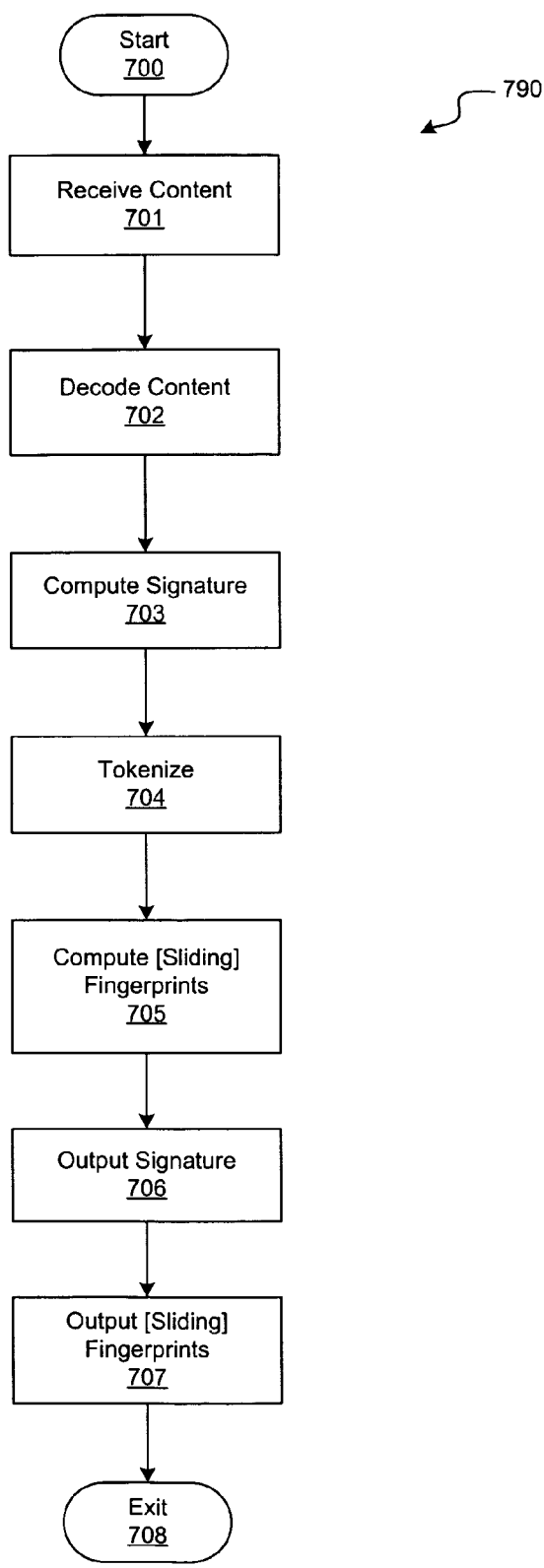
FIG. 7 is a conceptual flow diagram illustrating an embodiment of selected details relating to key computation, including generating content signatures and fingerprints.

FIG. 7, key computation flow diagram 790, conceptually illustrates an embodiment of selected details relating to key computation, including generating content signatures and fingerprints. The objective of key computation is to linguistically analyze and then hash content, producing a set of keys to use when monitoring network traffic for policy violations. A single key, termed a signature, is produced from the entire document, for detecting a full or exact match of content. However, since it is desired to detect partial, as well as exact matches of content, the document is also split into sections, and a key is produced for each section, resulting in a first set of keys termed sectional fingerprints. Further, as it is desired to reduce computation required during wire-speed content monitoring, a set of redundant keys is also produced. The document is split into a set of overlapping or "sliding" sections, and a key is produced for each sliding section, resulting in a second set of keys termed sliding sectional fingerprints.

Sliding sectional fingerprints may be understood by considering the following. It is desired to recognize matches of monitored content with respect to fragments of previously classified documents. Such matches will be termed partial matches. However, monitored fragments are generally not aligned with respect to the sections of the previously classified documents. A first approach to addressing the non-aligned fragment problem is to process the monitored content using all possible alignments of the monitored content with respect to the sections of the previously classified documents. When the number of words in the monitored content is large compared to the section size, the wire-speed computation required is approximately one key computation per word of the monitored content. However, the classified document key storage is minimized.

A second approach to addressing the non-aligned fragment problem is to detect partial matches by aligning the previously classified documents with respect to the monitored content. One way to do this is to process the classified documents using all possible alignments of the classified documents with respect to equal-sized sections (fragments of a predetermined size) of the monitored content. When the monitored content length is large compared to the section size, the wire-speed computation required is approximately K key computations, where K=(number of words in the monitored content)/(S), and where S is the section size. It can be seen that this is a factor S less than the wire-speed key computations required for the first approach. Therefore wire-speed key computations may be significantly reduced (at the expense of increased key storage) using the second approach, and the following description focuses on it.

In summary the second approach requires computation of sectional fingerprints on monitored content, and computation of sliding sectional fingerprints on classified documents, corresponding, in a first embodiment, to all possible alignments of the classified documents with respect to the monitored content. An example of these computations is provided elsewhere (see Sliding Sectional Fingerprints).

The processing described by key computation flow diagram 790 is performed in two contexts. First, file parser 502 performs these operations when classifying source content for representation in repository 555. This processing includes the pre-computation of sliding sectional fingerprints. Second, CAE 403 performs these operations when classifying monitored content for comparison to content information stored in the repository. This processing computes only (sectional) fingerprints, but not sliding sectional fingerprints, thus reducing the computation required during monitoring.

Key computation begins at "Start" 700, and proceeds to "Receive Content" module 701, where content for an entire document is received for processing. The entire document content is then provided to "Decode Content" operation 702, which decodes and extracts content from any of a variety of file formats into a plain-text representation, such as ASCII or Unicode. Decodable formats include: Microsoft Office applications (such as Outlook, Outlook Express, Word, Excel, PowerPoint, and the like), web content applications (such as HTML and XML), and standard document applications (such as Adobe PDF and plain text). Content may also be decoded and extracted when embedded in compressed files (such as zip files), or e-mail attachments.

The decoded content is then passed to "Compute Signature operation" 703, where a hash function (such as CRC32, MD5 and SHA) is computed on the decoded content. Flow then proceeds to "Tokenize" operation 704, where significant words in the decoded content are identified. White space, punctuation, and noise words (such as articles and conjunctions) are discarded. Definition of noise words and punctuation is language dependent. The decoded content is examined for specific language indicator words to determine an appropriate language. For example, words such as "and" and "the" indicate English, while words such as "avec" and "vous" indicate French. The result of "Tokenize" operation 704 is a set of tokens linguistically equivalent to the entire document content.

In an alternate embodiment, the order of processing of "Compute Signature" operation 703 and "Decode Content" operation 702 is reversed, such that the signature computation operates directly on the received content.

Flow then proceeds to "Compute [Sliding] Fingerprints" operation 705. Operation here depends on whether sectional fingerprints (performed by CAE 403) or sliding sectional fingerprints (performed by file parser 502) are required. If sectional fingerprints are required, then the tokens from 704 are split into non-overlapping sections of a pre-determined section size, S. If the number of tokens is not an even multiple of S, then the end of the last section is aligned with the last token, such that the beginning of the last section overlaps the end of the previous section so that the last section is size S.

If sliding sectional fingerprints are required, then in a first embodiment, the tokens are split into overlapping sections of the pre-determined section size S in the following manner. The first S tokens are assigned to the first section. The next section is formed by discarding the first token in the previous section, shifting over the remaining tokens, and then adding the next available token to the end. This process continues until there are no more available tokens. The result is that there are L overlapping sections, where L=total number of tokens−S+1. Note that when the number of tokens is not an even multiple of S, the last section naturally ends at the last token since sections "advance" one token at a time.

Processing the classified documents using all possible alignments, as in the first embodiment, guarantees detecting fragments of matching monitored content of at least size S, while minimizing key computations on the monitored content. However, in a second embodiment, the fragment matching requirement is relaxed, such that the minimum detectable matching fragment size may be larger than S.

Tokens are split into overlapping sections of size S, but sections are formed by "advancing" Y tokens at a time, instead of a single token at a time. More specifically, the first S tokens are assigned to the first section. The next section is formed by discarding the first Y tokens in the previous section, shifting over the remaining tokens, and then adding the next available Y tokens to the end. This process continues until there are no more available tokens. If the number of tokens is not an even multiple of Y, then the last section is formed by retaining enough tokens from the previous section so that the last section includes S tokens. The second embodiment may also be thought of as a variation of the first embodiment where selected sliding sectional fingerprints are skipped, i.e. not computed. For example, if Y is three, then a sliding sectional fingerprint is computed for the first section, fourth section, seventh section, and so forth (with respect to sections as determined by the first embodiment).

Monitored content key computation (performed by CAE 403) is not limited to sectional (i.e. non-overlapping) fingerprints. In alternate embodiments, the minimum detectable matching fragment size may be reduced by computing overlapping fingerprints for monitored content. Tokens are split into sections of size S and are formed by advancing Z tokens at a time, instead of S tokens at a time. The remainder of the key computation is identical to the previously described processing for classified document sliding sectional fingerprints.

Generally, any number of embodiments may be formed by varying the section size S, the classified document advance size Y, and the monitored content advance size Z. In order to guarantee that monitored content fragment matches are eventually detected, Y and Z must be relatively prime. As Y is reduced, the classified document key computation and storage requirements increase, while the minimum detectable matching fragment size decreases. As Z is reduced, the monitored content key computation increases, while the minimum detectable matching fragment size decreases.

After splitting the tokens into sections (either non-overlapping for sectional fingerprints or overlapping for sliding sectional fingerprints) a hash function (such as CRC32, MD5 and SHA) is computed based on the tokens in each section. Those of ordinary skill in the art will recognize that any suitable hash function may be used.

Flow then proceeds to "Output Signature" operation 706, where the previously computed signature (box 703) is made available. Following this, flow proceeds to "Output Fingerprint" operation 707, where the fingerprints previously computed, either sectional or sliding sectional (box 705), are made available. Flow then proceeds to "Exit" 708, and the key computation is complete.

Some embodiments provide for dynamic alteration of the section size S. However, when the section size is changed, all of the stored keys in the repository must be recomputed before content monitoring may resume. Some embodiments provide for dynamic alteration of the classified document advance size Y, the monitored content advance size Z, or both. The parameters Y and Z may be assigned values from one to S, independently of each other, as long as they remain relatively prime. Changes to Y necessarily require recomputing all of the stored keys before resuming content monitoring, but changes to Z may be made without any such recomputation.

Example embodiments include S=30, Y=30, and Z=1; S=15, Y=15, and Z=1; and S=22, Y=11, and Z=3. Those of ordinary skill in the art will recognize that these embodiments are examples only, and that other combinations of S, Y, and Z are possible.

Sliding Sectional Fingerprints (Example)

Sliding sectional fingerprints may be understood by the following example. Consider the decoded document text in Table 1, below, received by "Decode Content" operation 702.

TABLE 1

CHAPTER X

The two boys flew on and on, toward the village, speechless with horror. They glanced backward over their shoulders from time to time, apprehensively, as if they feared they might be followed. Every stump that started up in their path seemed a man and an enemy, and made them catch their breath; and as they sped by some outlying cottages that lay near the village, the barking of the aroused watch-dogs seemed to give wings to their feet.
"If we can only get to the old tannery before we break down!" whispered Tom, in short catches between breaths. "I can't stand it much longer."

After processing by "Tokenize" operation 704, tokens would be identified as shown in Table 2, below. Tokens are illustrated as square-bracketed ([ ]) text. For example, Token 1 is 'chapter', Token 2 is 'x', and so forth.

TABLE 2

Token 1: [chapter] [x]
Token 3:
Token 3: The [two] [boys] [flew] on and on, [toward] the [village], [speechless]
Token 9: with [horror]. They [glanced] [backward] [over] [their] [shoulders]
Token 15: [from] [time] to [time], [apprehensively], as [if] they [feared] they
Token 21: [might] be [followed]. [every] [stump] that [started] [up] in [their]
Token 28: [path] [seemed] a [man] and an [enemy], and [made] [them] [catch] [their]
Token 36: [breath]; and as they [sped] by [some] [outlying] [cottages] that [lay]
Token 42: [near] the [village], the [barking] of the [aroused] [watch-dogs]
Token 47: [seemed] to [give] [wings] to [their] [feet].
Token 52:
Token 52: "[if] [we] [can] [only] [get] to the [old] [tannery] [before] [we] [break] [down]!"
Token 63: [whispered] [tom], in [short] [catches] [between] [breaths]. "[i] [can't]
Token 71: [stand] it [much] [longer]."

Assuming the pre-determined section size S is 15, then sectional fingerprints would be computed by "Compute Fingerprints" operation 705 as shown in Table 3, below. Tokens are analyzed in groups of the section size, S (15 in this example), and a fingerprint for each resultant section is computed. There are five total sectional fingerprints in the example. Note that the number of tokens (73) is not an even multiple of the section size S (15). Thus the beginning of the last section, corresponding to fingerprint 5, partially overlaps with the previous section (by two tokens: "before" and "we"), so that the last section includes 15 tokens.

TABLE 3

Fingerprint 1 @1: 30e29d1cd7d617707f42812d15a1e7e6
    chapter x two boys flew toward village speechless horror glanced backward over their shoulders from
Fingerprint 2 @16: 2c1fa62021cada295e4abc58bbd0196d
    time time apprehensively if feared might followed every stump started up their path seemed man
Fingerprint 3 @31: 51103106f2a318c2dc6cdaf785c5e2fa
    enemy made them catch their breath sped some outlying cottages lay near village barking aroused
Fingerprint 4 @46: 54445610f4cf699ebc5cbe363ab923b9
    watch-dogs seemed give wings their feet if we can only get old tannery before we
Fingerprint 5 @59: 89059de8bf562e5f09fd180bf8a808d7
    before we break down whispered tom short catches between breaths i can't
    stand much longer Sliding sectional fingerprints would be computed by "Compute [Sliding] Fingerprints" operation 705 as shown in Table 4, below. Sliding one token at a time (the first embodiment), a total of 59 sliding sectional fingerprints are computed. Note that sliding fingerprint 1 is identical to fingerprint 1, and sliding fingerprint 16 (not shown) is identical to fingerprint 2, and so forth, as the underlying sectional data is identical.

TABLE 4

Sliding Fingerprint 1 @1: 30e29d1cd7d617707f42812d15a1e7e6
    chapter x two boys flew toward village speechless horror glanced backward over their shoulders from
Sliding Fingerprint 2 @2: d7c3f940095ac53ae3119536924be7c1
    x two boys flew toward village speechless horror glanced backward over their shoulders from time
Sliding Fingerprint 3 @3: 3a287005fa1cb655646e1cd9148c150e
    two boys flew toward village speechless horror glanced backward over their shoulders from time time
Sliding Fingerprint 4 @4: acc9b78ec4d3324c696a4b3f3a95eba7
    boys flew toward village speechless horror glanced backward over their shoulders from time time apprehensively
    . . .
Sliding Fingerprint 59 @59: 89059de8bf562e5f09fd180bf8a808d7
    before we break down whispered tom short catches between breaths i can't stand much longer In the second embodiment, when Y is three, sliding sectional fingerprints would be computed by "Compute [Sliding] Fingerprints" operation 705 as shown in Table 5, below. Sliding three tokens at a time, sliding fingerprints starting with tokens 2 and 3 are not computed, while a sliding fingerprint starting with token 4 is computed, and so forth. Note that the final sliding fingerprint (beginning with token 59) overlaps with the previous section (beginning with token 58) by 14 tokens, so that the last fingerprint covers 15 tokens.

TABLE 5

Sliding Fingerprint 1 @1: 30e29d1cd7d617707f42812d15a1e7e6
    chapter x two boys flew toward village speechless horror glanced backward over their shoulders from
Sliding Fingerprint @2: NOT COMPUTED
    x two boys flew toward village speechless horror glanced backward over their shoulders from time
Sliding Fingerprint @3: NOT COMPUTED
    two boys flew toward village speechless horror glanced backward over their shoulders from time time
Sliding Fingerprint 2 @4: acc9b78ec4d3324c696a4b3f3a95eba7
    boys flew toward village speechless horror glanced backward over their shoulders from time time apprehensively
    . . . Sliding Fingerprints 3-20 @7, 10, 13, 16, 19, 22, 25, 28, 31, 34, 37, 40, 43, 46, 49, 52, 55, and 58, respectively
Sliding Fingerprint 21 @59: 89059de8bf562e5f09fd180bf8a808d7
    before we break down whispered tom short catches between breaths i can't stand much longer Monitoring Traffic FIG. 8A, flow diagram 890, conceptually illustrates an embodiment of a wire-speed content monitoring aspect of the content appliance software 400. These operations correspond to "Monitor Traffic for Violations" 206 as described above.

Generally, streaming network traffic is captured and parsed at wire-speed into a plurality of monitored sessions. Each monitored session is further processed by computing an overall session signature, splitting the session into sections, and computing a set of session sectional fingerprints for the sections. Then repository 555 is consulted to classify the entire session by the overall session signature, if possible, or to individually classify each of the sections using the corresponding session sectional fingerprints, by searching public repository 636 and private repository 635. If a match is found only in the private keys, then the session signature or session sectional fingerprint is classified as private. If a match is found only in the public keys, then the session signature or session sectional fingerprint is classified as public. If no match is found in either the private or the public keys, then the session signature or session sectional fingerprint is classified as unknown. If a match is found in the private keys, and a match is also found in the public keys, then the public classification overrides the private classification, and the session signature or session sectional fingerprint is classified as public.

If the signature for the overall session is successfully classified as public or private, (i.e. a match was found in repository 555) then that classification is used for the overall classification of the given session. This corresponds to a full content match, indicating the entire session corresponds to a previously classified document. In an alternate embodiment that reduces the total processing required, sectional fingerprints are not computed (or searched for in the repository) if there is a session signature match in the repository.

If the signature for a session is classified as unknown, indicating that there is not a full content match, then a check is made for a partial content match. The corresponding set of sectional fingerprint classifications are combined into an overall classification for each of the monitored sessions. This corresponds to a partial content match, indicating some portion of the entire session is linguistically equivalent to some document content represented in the repository. If any of the sectional fingerprints of a given monitored session are classified as private, then the overall classification for the given session is private. If all of the sectional fingerprints of the given monitored session are classified as public, then the overall classification for the given session is public. If the previous two conditions are not met, then the overall classification for the given session is unknown.

The overall classification for each of the sessions is then used with other information about the session to locate the first matching policy. If the first matching policy is found, then the session is allowed or audited (to audit log 113), as defined by the policies provided by "Create Policies" operation 205. If there is no matching policy found, then the session is also allowed.

More specifically, flow begins at "Start" box 800, and then proceeds to "Monitor and Parse Data" operation 801. This operation is described in more detail elsewhere (see Data Collection), and corresponds to processing performed by packet capture engine software 409, TCP session re-assembly software 408, and dynamic protocol determination software 407. Briefly the monitor and parse collection operation captures network traffic and parses it into a collection of monitored sessions. Each monitored session is then processed according to operations identified by "Session Repeat Block" 815.

For each monitored session, flow then proceeds to "Compute Signature and Sectional Fingerprints" operation 802 (corresponding to processing performed by CAE 403), which receives the monitored session traffic data. The monitored session traffic data is processed according to key computation flow diagram 790, as a complete document, producing a signature and sectional fingerprints. Each resultant fingerprint is then processed according to operations identified by "Fingerprint Repeat Block" 814. The signature and fingerprints for each monitored session are then resolved into a single classification by "Combine Fingerprint Classifications" operation 809.

For each fingerprint, flow then proceeds to search private portion of repository operation ("Repository Private Match?") 803. This operation searches private repository 635 to determine if there is an entry having a key value matching the fingerprint. If a match is found, then flow proceeds along "Yes" 822 to search public portion of repository operation ("Repository Public Match?") 804.2. This operation searches public repository 636 to determine if there is an entry having a key value matching the fingerprint. If a match is not found, then flow proceeds along "No" 827 to set private class operation ("Fingerprint Private Class") 812. At this point, the fingerprint is known to correspond to some content previously classified as private, but not any content previously classified as public, and therefore the fingerprint is classified as private.

The other exit path from operation 803, "No" 820, flows to search public portion of repository operation ("Repository Public Match?") 804.1. This operation is identical in operation to 804.2. In this instance, if a match is found, flow proceeds along path "Yes" 823, to set public class operation ("Fingerprint Public Class") 808. At this point, the fingerprint is known to correspond to some content previously classified as public (and not any content previously classified as private), and therefore the fingerprint is classified as public.

The other exit path from operation 804.1, "No" 821, flows to set unknown class operation ("Fingerprint Unknown Class") 805. At this point, the fingerprint is known to lack correspondence to any content previously classified as public and to lack correspondence to any content previously classified as private. Therefore the fingerprint is classified as unknown.

The other exit path from operation 804.2, "Yes" 824, flows to "Override Private With Public" classification operation 807. At this point, the fingerprint is known to correspond to some content previously classified as private, and to correspond to some content previously classified as public. The private classification is overridden by the public classification, and therefore the fingerprint is classified as public.

Figure 8A:
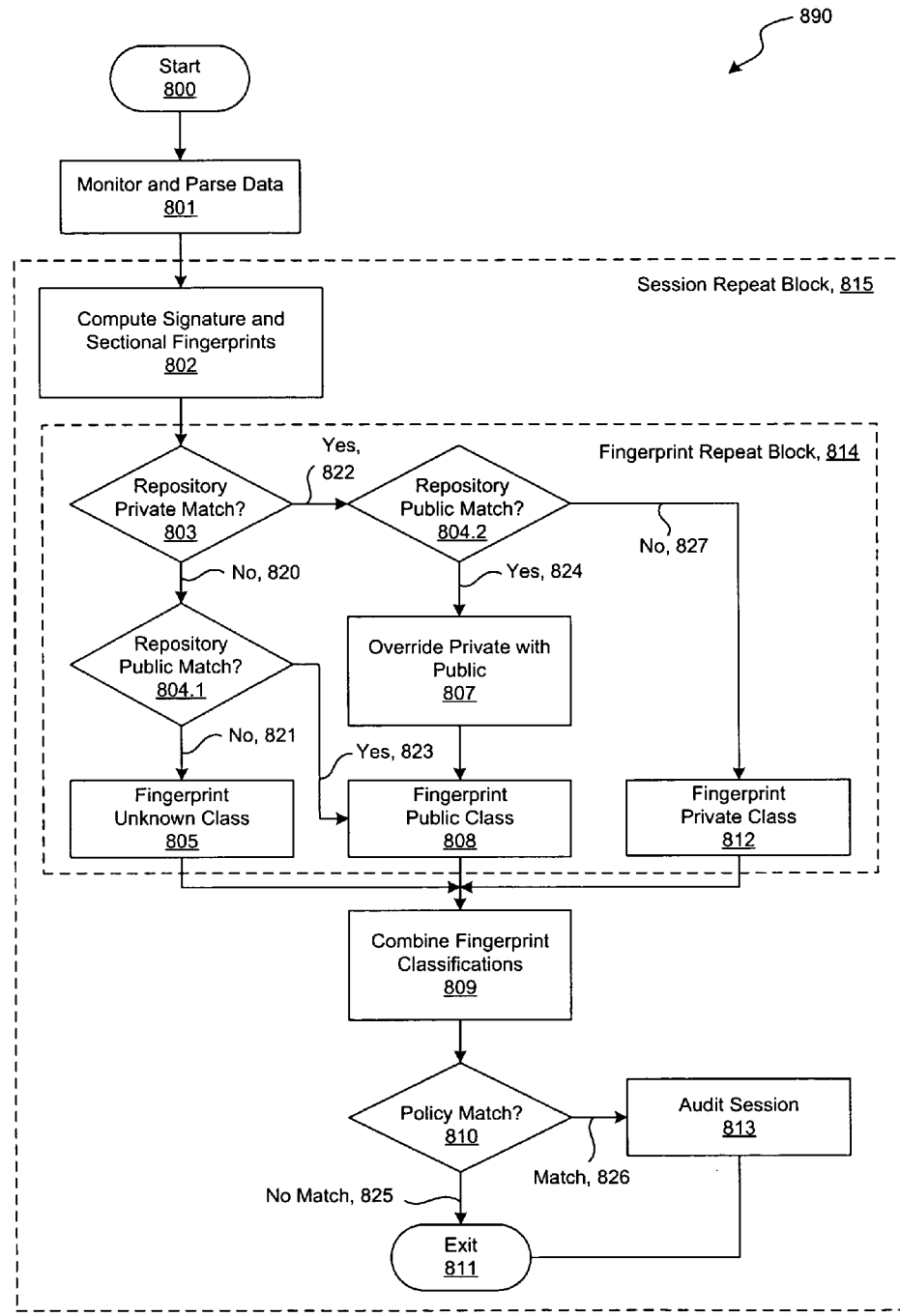
FIG. 8A is a conceptual flow diagram illustrating an embodiment of a wire-speed content monitoring aspect of the content appliance software.
Figure 8B:
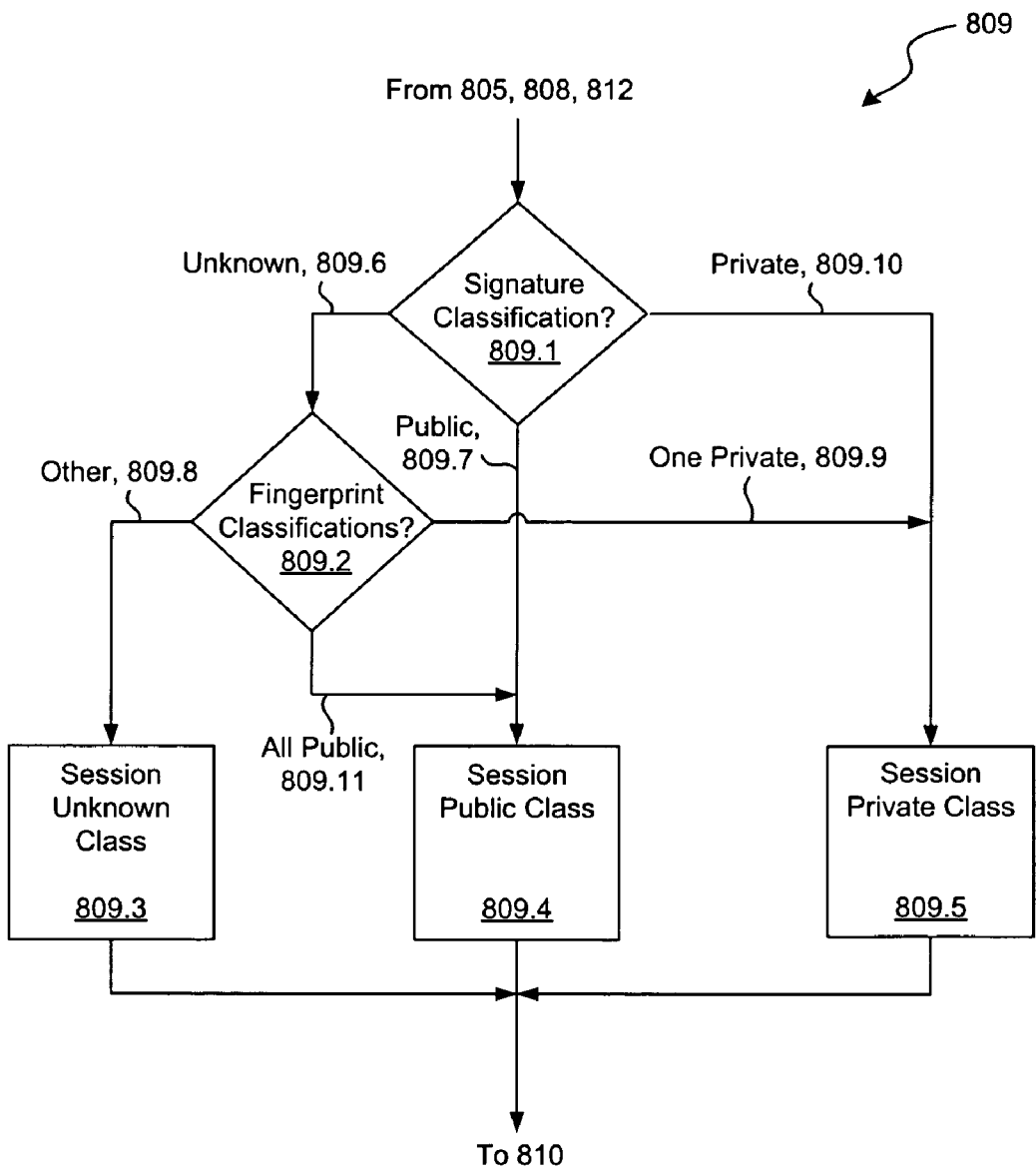
FIG. 8B is a conceptual flow diagram illustrating an embodiment of selected details of session-level signature and fingerprint combining.

FIG. 8B, corresponding to "Combine Fingerprint Classifications" operation 809, conceptually illustrates selected details of session-level signature and fingerprint combining. "Combine Fingerprint Classifications" operation 809 collects the signature classification for each session, and all of the fingerprint classifications for all of the sectional fingerprints for each session, and combines them in the following manner to produce an overall classification for each session. If the signature classification is public or private ("Signature Classification?" test 809.1), then the overall classification for each session is public (path "Public" 809.7 and "Session Public Class" 809.4) or private (path "Private" 809.10 and "Session Private Class" 809.5), respectively. If the signature classification is unknown, i.e. not public and not private (path "Unknown" 809.6), and at least one of the fingerprint classifications is private ("Fingerprint Classifications?" test 809.2 along path "One Private" 809.9), then the overall classification for each session is also private ("Session Private Class" 809.5). If the signature classification is unknown (path "Unknown" 809.6), and all of the fingerprint classifications are public ("Fingerprint Classifications?" test 809.2 along path "All Public" 809.11), then the overall classification of each session is also public. In all other cases (path "Other" 809.8) the overall classification for each session is unknown ("Session Unknown Class" 809.3).

Flow then proceeds to policy search operation "Policy Match?" 810 (corresponding to processing performed by policy manager software 402), where policies defined in "Create Policies" 205 are searched in order for the first (if any) match with the session. Search criteria include several factors associated with the session: the overall classification (the content class), the session (or transmission) protocol, the source and destination IP addresses and ports, and optionally the "From" and "To" fields for e-mail. If a match is found, then searching terminates (no other policies are examined) and flow proceeds along "Match" 826 to "Audit Session" operation 813. If a match is not found, then flow continues along path "No Match" 825 to "Exit" block 811, as processing is complete.

"Audit Session" operation 813 (corresponding to processing performed by auditor software 401), may terminate, allow, or record identifying audit information concerning the session, as determined by the matching policy. Audit information recorded in audit log 113 includes the time of the audit, information identifying the matching policy, and the specific search criteria that matched the policy (classification, protocol, IP addresses and ports, "From", and "To" fields). Other information about the content match is also recorded, such as whether the content classification match was full (by signature) or partial (by one or more fingerprints), and the file number (or numbers) associated with any matching signature or fingerprint. All audit information is stored in an encrypted format. The processing is thus complete and flow continues to "Exit" block 811.

In embodiments where the repository keys in 636 and 635 are computed with a classified document advance size Y greater than one (and a monitored content advance size Z greater than one), the flow illustrated in FIG. 8A is not guaranteed to locate the earliest possible match between the monitored content and classified content. This is because the classified content keys lack information about all possible alignments of the classified content with respect to the monitored content. In some embodiments this is acceptable, but in other embodiments, an alternate flow is used to determine the first match between the classified content and the monitored content.

The alternate flow generally serves to "synchronize" the alignment of the monitored content with respect to the classified content in order to locate the earliest possible match between the two contents. When a candidate first match is located in the monitored content using sectional fingerprints computed as described with respect to "Compute Signature and Sectional Fingerprints" operation 802, the monitored content is "rewound" to an earlier point. A window of sectional fingerprints (including at least Y*Z+S preceding tokens) is recomputed with the monitored content advance size Z equal to one. The recomputed sectional fingerprints are then used to search in the repository keys to determine the earliest match between the monitored content and the classified content.

If an earlier match is found, then in some embodiments the location of the earlier match with respect to the monitored content is used as a revised starting point for the recomputation of sectional fingerprints, using the original monitored content advance size Z. In other embodiments, the monitored content sectional fingerprints are recomputed with a content advance size of one and compared with the repository keys until the monitored content no longer matches the repository keys. This is detected when there are at least Y (the classified document advance size) contiguous sectional fingerprints in the monitored content that are not located in either repository.

Figure 8C:
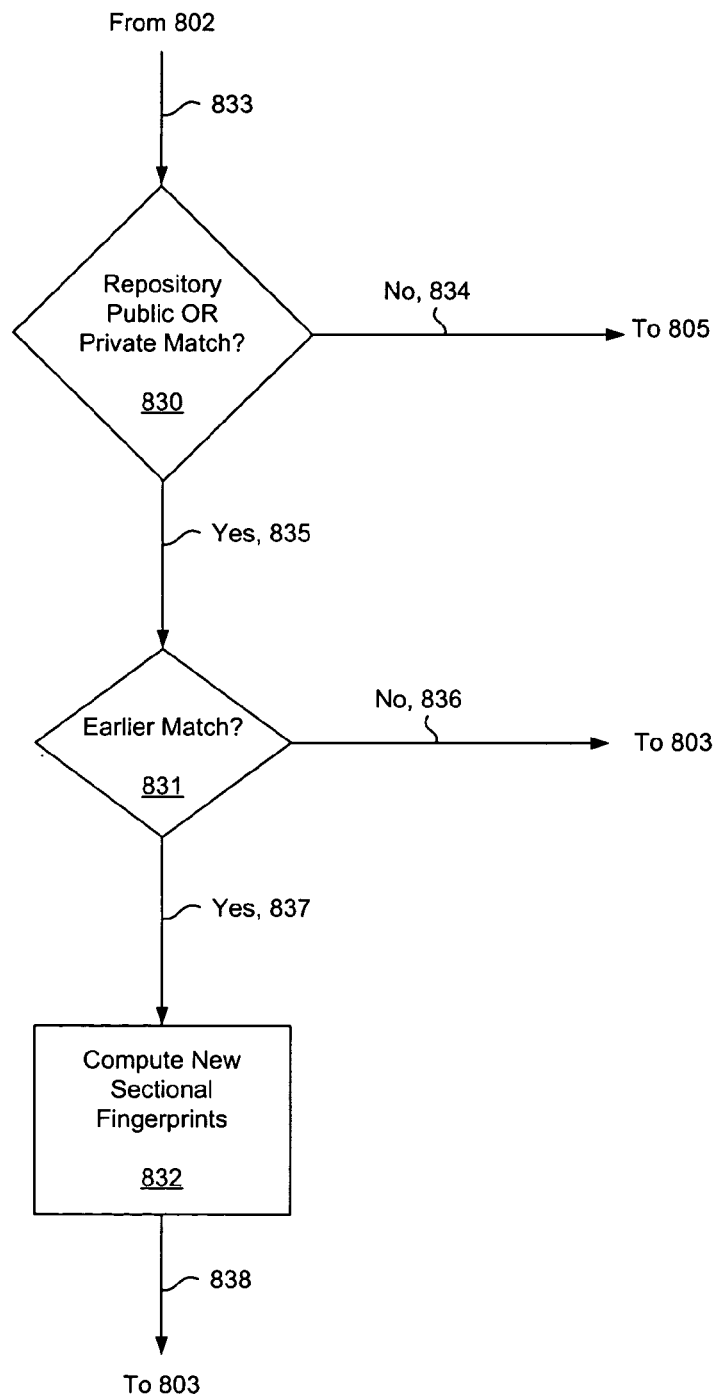
FIG. 8C is a conceptual flow diagram illustrating an embodiment of selected details of synchronization of matching of monitored content and classified content.

FIG. 8C is a conceptual flow diagram illustrating an embodiment of selected details of the synchronization of the matching of monitored content and classified content. In this embodiment, flow is unconditionally transferred from "Compute Signature and Sectional Fingerprints" operation 802 (FIG. 8A) to "Repository Public OR Private Match" operation 830, as illustrated by 833 (instead of transferring to "Repository Private Match?" operation 803). This operation searches public repository 636 and private repository 635 to determine if there is an entry in either repository having a key value matching the fingerprints. If a match is not found, then flow proceeds along "No" 834 to rejoin the flow of FIG. 8A at "Fingerprint Unknown Class" 805.

If a match is found, then flow proceeds along "Yes" 835 to "Earlier Match?" operation 831. This operation determines if there is an earlier match between the monitored content and the classified content, recomputing sectional fingerprints as described above. If there is no earlier match found, then flow proceeds along "No" 836 to rejoin the flow of FIG. 8A at "Repository Private Match?" 803.

If an earlier match is found, then flow proceeds along "Yes" 837 to "Compute New Sectional Fingerprints" 832. This operation computes new sectional fingerprints based on a revised alignment determined by the match discovered in "Earlier Match?" operation 831. Flow then proceeds along 838 to rejoin the flow of FIG. 8A at "Repository Private Match?" 803.

Those of ordinary skill in the art will recognize that the order and organization of the operations of FIG. 8A and FIG. 8C are illustrative only, and may be reordered and combined in a variety of manners. For example, "Repository Public OR Private Match" operation 830 may be combined with any combination of "Repository Private Match?" operation 803, "Repository Public Match?" operation 804.1, and "Repository Public Match?" operation 804.2.

Data Collection

Figure 9:
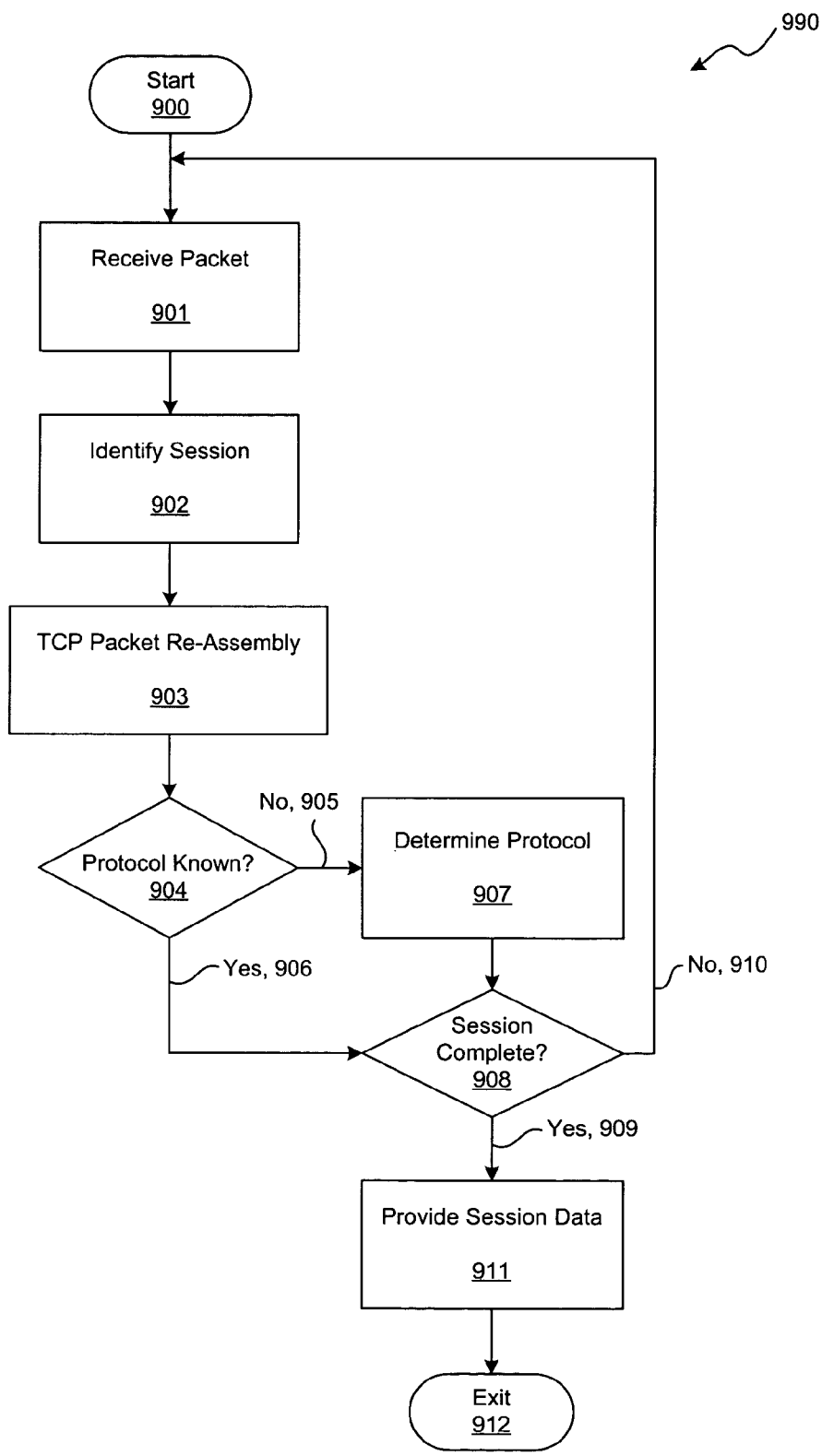
FIG. 9 is a conceptual flow diagram illustrating an embodiment of selected details relating to processing a packet.

FIG. 9, flow diagram 990, conceptually illustrates an embodiment of selected details relating to processing a packet, as performed by portions of content appliance software 400. The flow 990 processing corresponds to "Monitor and Parse Data" operation 801, described elsewhere. Generally data collection entails capturing packets of data, identifying and separating them by session, ordering the packets in each session, determining the protocol for each session, and then when the session is complete, providing the session packet data for further processing.

Specifically, flow begins at Start box 900, and continues to "Receive Packet" operation 901 (corresponding to packet capture engine software 409). The receive packet operation interfaces to network interface circuits 304.1 and 304.2 via operating system calls to receive data in packets. Flow then proceeds to "Identify Session" operation 902, where the packet data is examined to determine the session it is part of.

Flow then continues to "TCP Packet Re-Assembly" operation 903 (corresponding to TCP session re-assembly software 408). Here the packet data, which arrives in an arbitrary order, is re-assembled on a per session basis in the correct order according to proper TCP processing. Flow then continues to "Protocol Known?" check operation 904, where a determination is made as to whether the protocol for the session is known. If it is known, then flow proceeds along path "Yes" 906 to "Session Complete?" check operation 908. If the protocol is not known, then flow proceeds to "Determine Protocol" operation 907 along path "No" 905.

"Determine Protocol" operation 907 (corresponding to dynamic protocol determination software 407) analyzes previously received packet data for the session to determine the associated protocol. Protocol types as supplied by "Defining Network Boundaries" 203 may also be examined to assist in determining or further confirming the protocol associated with the session. It may not be possible to determine the protocol associated with the session based on information available at a given point in time, since packets may arrive in an arbitrary order. In this case the protocol remains unknown.

After determining (or leaving unknown) the protocol, flow proceeds to "Session Complete?" check operation 908.

"Session Complete?" check operation 908 selectively enables one of protocol software SMTP 404, FTP 405, and HTTP 406 according to the session protocol, to determine if the session is complete. If the session is complete, then flow proceeds along path "Yes" 909 to "Provide Session Data" operation 911, where the session data, protocol, and other information is made available for further processing. Flow then proceeds to "Exit" box 912. If the session is not complete at check operation 908, then flow proceeds along path "No" 910 to "Receive Packet" 901, to process the next received packet.

In some embodiments, a session is considered complete by "Session Complete?" check operation 908 when all of the packets corresponding to the session have been received. In other embodiments, a session is considered to be complete, at least with respect to providing session data for further processing, as soon as a contiguous group of packets, including the first packet of the session, has been received. Further groups of contiguous packets may also be considered as complete sessions with respect to further processing.

APPLICATIONS AND VARIATIONS

Additional variations employ additional non-public content classifications. For example, additional classifications may include source code, human-resource documents, and financial data.

Further additional variations provide the ability to treat a file or a directory tree of files reachable by the discovery agent as if it were monitored content. For example, a portion of a file system may be processed by the agent as monitored content, and if private content is discovered in any of the underlying files, an e-mail alert may be sent to the administrator, or an audit log entry may be recorded.

Further applications include installing the content appliance and creating policies to allow for monitoring internal network transmission of private content, for example between an engineering department and a marketing department. In this application policies are defined to detect the marketing department inappropriately "pre-releasing" information from the engineering department before the information is to be made public.

Further additional variations include providing software routines for performing the functions of content classification and traffic monitoring for incorporation in a router, firewall or other Internet appliance. Alternatively these software routines may be partially implemented more directly in hardware included in these appliances.

Further additional variations include configuring a file server to perform the functions of content classification, but instead of monitoring traffic, the file server monitors incoming data to be written to the file system. If private content is detected in the file data, then the file is not written as requested, and an e-mail message to an administrator may be issued. A file server configured as a public web-server is an example of this variation.

CONCLUSION

Those skilled in the art will recognize that the flow diagrams provided herein are conceptual in nature and do not limit the invention to the details of the illustrative embodiments. In particular, for various reasons, the various processing operations may be partitioned differently (e.g., certain operations may be combined, while other operations may be further divided) and other equivalent control-flow topologies may be used.

Although the foregoing embodiments have been described in some detail for purposes of clarity of understanding, the invention is not limited to the details provided. There are many ways of implementing the invention. The disclosed embodiments are illustrative and not restrictive. It will be understood that many variations in construction, arrangement and use are possible consistent with the teachings and within the scope of the invention. For example, interconnect and function-unit bit-widths, clock speeds, and the type of technology used may generally be varied in each component block of the invention. Also, unless specifically stated to the contrary, the value ranges specified, the maximum and minimum values used, or other particular specifications are merely those of the illustrative or preferred embodiments, can be expected to track improvements and changes in implementation technology, and should not be construed as limitations of the invention.

Functionally equivalent techniques known to those of ordinary skill in the art may be employed instead of those illustrated to implement various components or sub-systems. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware).

Specific variations include, but are not limited to: IP addresses according to IPv4, IPv6, and other related standards; and partitioning functions between software and hardware; and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components without altering the basic cooperation among the remaining elements. It is thus understood that much of the details disclosed are not required to implement various aspects of the concepts taught. To the extent that the remaining elements are distinguishable from the prior art, omitted components are not limiting on the concepts taught herein.

All such variations in design comprise insubstantial changes over the teachings conveyed by the illustrative embodiments. The names given to interconnect and logic are illustrative, and should not be construed as limiting the invention. It is also understood that the invention has broad applicability to other computing applications, and is not limited to the particular application or industry of the illustrated embodiments. The present invention is thus to be construed as including all possible modifications and variations encompassed within the scope of the appended claims.

What is claimed is:

1. A method comprising:
   computing a set of reference sectional fingerprints corresponding to a reference document having a classification selected from a group comprising at least a public classification and a private classification, wherein successful access to the reference document by discovery agent software results in the reference document having the public classification and otherwise having a classification other than the public classification, and at least one of the reference sectional fingerprints is based at least in part on two or more tokens of the reference document, the tokens being selected from remaining words of the reference document after exclusion of a set of language-dependent words of the reference document;

associating the reference sectional fingerprints with the classification of the reference document;

after the associating, monitoring network traffic via a network interface;

computing a set of traffic sectional fingerprints corresponding to the monitored network traffic, wherein at least one of the traffic sectional fingerprints is based at least in part on two or more tokens of the monitored network traffic;

determining that at least one of the traffic sectional fingerprints matches at least one of the reference sectional fingerprints;

for each respective traffic sectional fingerprint matching at least one of the reference sectional fingerprints associated with the public classification, classifying the respective traffic sectional fingerprint as the public classification;

for each respective traffic sectional fingerprint matching none of the reference sectional fingerprints associated with the public classification and matching at least one of the reference sectional fingerprints associated with the private classification, classifying the respective traffic sectional fingerprint as the private classification;

wherein the act of associating, the acts of computing, and the act of determining are at least in part via one or more central processing units enabled to execute software;

wherein the reference sectional fingerprints and the traffic sectional fingerprints are sliding sectional fingerprints;

wherein the reference document is interpreted as groups of contiguous token strings and each reference sliding sectional fingerprint corresponds to one of the groups of reference document contiguous token strings; and wherein the monitored network traffic is interpreted as groups of contiguous token strings and each traffic sliding sectional fingerprint corresponds to one of the groups of monitored traffic contiguous token strings.

2. The method of claim 1, wherein:
each group of reference document contiguous token strings being the same predetermined length of tokens.

3. The method of claim 2, wherein:
the groups of reference document contiguous token strings comprise one of every possible contiguous token string of the same predetermined length.

4. The method of claim 2, wherein:
the groups of reference document contiguous token strings do not comprise one of every possible contiguous token string of the same predetermined length.

5. The method of claim 1, wherein:
the reference sliding sectional fingerprints are non-overlapping reference sliding sectional fingerprints.

6. The method of claim 1, wherein:
each group of monitored traffic contiguous token strings being the same predetermined length of tokens.

7. The method of claim 6, wherein:
the groups of monitored traffic contiguous token strings comprise one of every possible contiguous token string of the same predetermined length.

8. The method of claim 6, wherein:
the groups of monitored traffic contiguous token strings do not comprise one of every possible contiguous token string of the same predetermined length.

9. The method of claim 1, wherein:
the traffic sliding sectional fingerprints are non-overlapping traffic sliding sectional fingerprints.

10. The method of claim 1, wherein:
each of the reference document groups and each of the monitored traffic groups are the same predetermined length of tokens.

11. The method of claim 10, wherein:
the groups of reference document contiguous token strings do not comprise one of every possible contiguous token string of the same predetermined length.

12. The method of claim 10, wherein:
the groups of monitored traffic contiguous token strings do not comprise one of every possible contiguous token string of the same predetermined length.

13. The method of claim 1, further comprising:
in response to the act of determining finding a match, performing, at least in part via the one or more central processing units, a first action, and otherwise performing a second action.

14. The method of claim 13, wherein:
the first action comprises a flagging action, and the second action is no action.

15. The method of claim 14, wherein:
the first action further comprises writing information to a log.

16. The method of claim 1, further comprising:
performing, at least in part via the one or more central processing units, an action selected from a group of actions comprising a first and a second action according to the classification of the at least one of the traffic sliding sectional fingerprints.

17. The method of claim 16, wherein:
the first action is no action.

18. The method of claim 17, wherein:
the second action comprises a flagging action.

19. The method of claim 18, wherein:
the second action further comprises writing information to a log.

20. The method of claim 1, further comprising:
in response to the act of determining finding no match, associating, at least in part via the one or more central processing units, the classifications of all of the traffic sliding sectional fingerprints as unknown.

21. The method of claim 20, further comprising:
performing an action, at least in part via the one or more central processing units, selected from a group of actions comprising a first, a second, and an unknown action according to the classification of the at least one of the traffic sectional fingerprints.

22. The method of claim 21, wherein:
the first action is no action.

23. The method of claim 22, wherein:
the second action comprises a first flagging action.

24. The method of claim 23, wherein:
the unknown action comprises a second flagging action.

25. The method of claim 1, wherein:
as a result of the discovery agent software not successfully accessing the reference document, the reference document has the private classification.

26. A method comprising:
computing document sliding sectional fingerprints corresponding to a first and a second document, wherein successful access to the first document by discovery agent software results in the first document having a public classification and unsuccessful access to the second document by the discovery agent software results in the second document having a private classification, and at least one of the document sliding sectional fingerprints is based at least in part on two or more tokens of at least one of the documents, the tokens being selected from remaining words of the at least one document after exclusion of a set of language-dependent words of the at least one document;
associating the document sliding sectional fingerprints with the classification of the corresponding document;
after the associating, monitoring network traffic via a network interface;
computing a set of traffic sliding sectional fingerprints corresponding to the monitored network traffic, wherein at least one of the traffic sliding sectional fingerprints is based at least in part on two or more tokens of the monitored network traffic;
for each of the traffic sliding sectional fingerprints
classifying the traffic sliding sectional fingerprint as the public classification in response to the traffic sliding sectional fingerprint matching at least one of the document sliding sectional fingerprints associated with the public classification, and
classifying the traffic sliding sectional fingerprint as the private classification in response to the traffic sliding sectional fingerprint matching none of the document sliding sectional fingerprints associated with the public classification and matching at least one of the document sliding sectional fingerprints associated with the private classification;
wherein the acts of computing, the act of associating, and the acts of classifying are at least in part via one or more central processing units enabled to execute software;
wherein each document is interpreted as groups of contiguous token sections and each document sliding sectional fingerprint corresponds to one of the groups of document contiguous token sections; and
wherein the monitored network traffic is interpreted as groups of contiguous token sections and each traffic sliding sectional fingerprint corresponds to one of the groups of monitored traffic contiguous token sections.

27. The method of claim 26, further comprising:
classifying the monitored network traffic as the private classification in response to any of the traffic sliding sectional fingerprints being classified as the private classification.

28. The method of claim 27, further comprising:
classifying, at least in part via the one or more central processing units, the monitored network traffic as the public classification in response to
none of the traffic sliding sectional fingerprints being classified as the private classification and
all of the traffic sliding sectional fingerprints being classified as the public classification.

29. The method of claim 28, further comprising:
classifying, at least in part via the one or more central processing units, the monitored network traffic as a third classification in response to
none of the traffic sliding sectional fingerprints being classified as the private classification and
at least one of the traffic sliding sectional fingerprints being not classified as the public classification.

30. The method of claim 29, wherein:
the third classification is an unknown classification.

31. The method of claim 26, further comprising:
for each of the traffic sliding sectional fingerprints
classifying, at least in part via the one or more central processing units, the traffic sliding sectional fingerprint as a third classification in response to the traffic sliding sectional fingerprint matching none of the document sliding sectional fingerprints associated with the public classification and matching none of the document sliding sectional fingerprints associated with the private classification.

32. The method of claim 26, wherein:
as a result of the discovery agent software not successfully accessing the first document, the first document has the private classification, and as a result of the discovery agent software successfully accessing the second document, the second document has the public classification.

33. A system comprising:
a sliding sectional fingerprint unit implemented at least in part via a hardware accelerator and enabled to compute a set of document sliding sectional fingerprints corresponding to a document having a classification selected from a group comprising at least a public classification and a private classification, wherein successful access to the document by discovery agent software results in the document having the public classification and otherwise having a classification other than the public classification, the sliding sectional fingerprint unit being further enabled to compute at least one of the document sliding sectional fingerprints based at least in part on two or more tokens of the document, the tokens being selected from remaining words of the document after exclusion of a set of language-dependent words of the document, and the sliding sectional fingerprint unit being further enabled to associate the document sliding sectional fingerprints with the classification of the document;
a network traffic monitoring and analyzing unit implemented at least in part via the hardware accelerator, coupled to the sliding sectional fingerprint unit, and enabled to compute a set of traffic sliding sectional fingerprints corresponding to monitored network traffic, at least one of the traffic sliding sectional fingerprints being based at least in part on two or more tokens of the monitored network traffic;
wherein the network traffic monitoring and analyzing unit is further enabled to determine that at least one of the traffic sliding sectional fingerprints matches at least one of the document sliding sectional fingerprints;
wherein for each respective traffic sliding sectional fingerprint, the network traffic monitoring and analyzing unit is further enabled to classify the respective traffic sliding sectional fingerprint as the public classification in response to the respective traffic sliding sectional fingerprint matching at least one of the document sliding sectional fingerprints associated with the public classification, and as the private classification in response to the respective traffic sliding sectional fingerprint matching none of the document sliding sectional fingerprints associated with the public classification and matching at least one of the document sliding sectional fingerprints associated with the private classification;
wherein the document is interpreted as groups of contiguous token sections and each document sliding sectional fingerprint corresponds to one of the groups of document contiguous token sections; and
wherein the monitored network traffic is interpreted as groups of contiguous token sections and each traffic sliding sectional fingerprint corresponds to one of the groups of monitored traffic contiguous token sections.

34. The system of claim 33, further comprising:
a repository unit coupled to the sliding sectional fingerprint unit and enabled to store the document sliding sectional fingerprints according to the classification of the document.

35. The system of claim 34, wherein:
the repository unit is further coupled to the traffic monitoring and analyzing unit; and
the traffic monitoring and analyzing unit is further enabled to search the repository unit to determine that at least one of the traffic sliding sectional fingerprints matches at least one of the document sliding sectional fingerprints.

36. The system of claim 33, wherein:
the traffic monitoring and analyzing unit is further enabled to perform a first action in response to the match being determined and otherwise to perform a second action.

37. The system of claim 36, wherein:
the first action comprises a flagging action, and the second action is no action.

38. The system of claim 37, wherein:
the traffic monitoring and analyzing unit further comprises a log, and the flagging action comprises writing information to the log.

39. The system of claim 36, wherein:
the first action comprises a blocking action, and the second action is no action.

40. The system of claim 39, wherein:
the traffic monitoring and analyzing unit further comprises a log, and the blocking action comprises writing information to the log.

41. The system of claim 33, wherein:
the sliding sectional fingerprint unit comprises a processor executing software functions enabling the document sliding sectional fingerprint computation.

42. The system of claim 33, wherein:
the traffic monitoring and analyzing unit comprises a processor executing software functions enabling the traffic sliding sectional fingerprint computation.

43. The system of claim 42, wherein:
the traffic monitoring and analyzing unit further comprises a network interface coupled to the processor; and the software functions further enable collecting the monitored network traffic via the network interface.

44. The system of claim 33, wherein:
the document sliding sectional fingerprint computation comprises tokenizing the document.

45. The system of claim 44, wherein:
the tokenizing comprises
identifying significant words, and
discarding any combination of white space, punctuation, articles, and conjunctions.

46. The system of claim 44, wherein:
the document sliding sectional fingerprint computation further comprises splitting results of the tokenizing into overlapping sections.

47. The system of claim 46, wherein:
the document sliding sectional fingerprint computation comprises computing a hash function for each overlapping section, and the document sliding sectional fingerprints comprise results of the hash function computation.

48. The system of claim 33, wherein:
the traffic sliding sectional fingerprint computation comprises tokenizing the monitored network traffic.

49. The system of claim 48, wherein:
the tokenizing comprises
identifying significant words, and
discarding any combination of white space, punctuation, articles, and conjunctions.

50. The system of claim 49, wherein:
the traffic sliding sectional fingerprint computation further comprises splitting results of the tokenizing into contiguous non-overlapping sections.

51. The system of claim 50, wherein:
the traffic sliding sectional fingerprint computation comprises computing a hash function for each non-overlapping section, and the traffic sliding sectional fingerprints include results of the hash function computation.

52. The system of claim 49, wherein:
the traffic sliding sectional fingerprint computation further comprises splitting results of the tokenizing into contiguous overlapping sections.

53. The system of claim 52, wherein:
the traffic sliding sectional fingerprint computation comprises computing a hash function for each overlapping section, and the traffic sliding sectional fingerprints comprise results of the hash function computation.

54. The system of claim 33, wherein:
as a result of the discovery agent software not successfully accessing the document, the document has the private classification.

55. A system comprising:
a content appliance comprising
a repository having a first portion and a second portion corresponding respectively to a public classification and a private classification,
a processor coupled to the repository and enabled to execute content appliance software, and
a network interface coupled to the processor;
a computer coupled to the content appliance, the computer enabled to execute computer software;
wherein the content appliance software comprises functions enabling
receiving keys and corresponding file classification from the computer and storing the keys in a portion of the repository selected according to the file classification,
sampling network traffic via the network interface,
computing traffic sliding sectional fingerprints based on the sampled network traffic, at least one of the traffic sliding sectional fingerprints being based at least in part on two or more tokens of the sampled network traffic, and
classifying each traffic sliding sectional fingerprint computed, as the public classification in response to the traffic sliding sectional fingerprint matching any of the keys in the first portion of the repository, as the private classification in response to the traffic sliding sectional fingerprint not matching any of the keys in the first portion of the repository and matching any of the keys in the second portion of the repository, and as a third classification otherwise;
wherein the computer software comprises functions enabling
receiving a file and computing a corresponding set of file sliding sectional fingerprints, at least one of the file sliding sectional fingerprints being computed based at least in part on two or more tokens of the file, the tokens being selected from remaining words of the file after exclusion of a set of language-dependent words of the file, and providing the file sliding sectional fingerprints and a classification of the file to the content appliance as a set of keys, the classification being the public classification as a result of the file being successfully accessed by discovery agent software and being a classification other than the public classification as a result of the file not being successfully accessed by the discovery agent software;

wherein the file is interpreted as groups of contiguous token sections and each file sliding sectional fingerprint corresponds to one of the groups of file contiguous token sections; and wherein the sampled network traffic is interpreted as groups of contiguous token sections and each traffic sliding sectional fingerprint corresponds to one of the groups of sampled traffic contiguous token sections.

56. The system of claim 55, wherein:
the computer software comprises further functions enabling
crawling a designated plurality of file hierarchies and providing discovered files to enable receiving and computing file sliding sectional fingerprints.

57. The system of claim 55, wherein:
the receiving comprises parsing the discovered file according to a determined file type and converting content included in the discovered file to canonical information suitable for the computing file sliding sectional fingerprints.

58. The system of claim 57, wherein:
the determined file types comprise any combination of
a text file type;
an ASCII file type;
a Unicode file type;
an e-mail file type;
an e-mail attachment file type;
a compressed file type;
an HTML file type;
an XML file type;
a Microsoft Office application file type; and
an Adobe PDF file type.

59. The system of claim 55, wherein:
the computing file sliding sectional fingerprints and the computing traffic sliding sectional fingerprints comprise tokenizing.

60. The system of claim 59, wherein:
the tokenizing comprises
identifying significant words, and
discarding any combination of white space, punctuation, articles, and conjunctions.

61. The system of claim 55, wherein:
the file contiguous token sections are overlapping file contiguous token sections.

62. The system of claim 61, wherein:
each file sliding sectional fingerprint is based on a hash function computed on a corresponding one of the overlapping file contiguous token sections.

63. The system of claim 55, wherein:
the traffic contiguous token sections are non-overlapping traffic contiguous token sections.

64. The system of claim 63, wherein:
each traffic sliding sectional fingerprint is based on a hash function computed on a corresponding one of the non-overlapping traffic contiguous token sections.

65. The system of claim 55, wherein:
the traffic contiguous token sections are overlapping traffic contiguous token sections.

66. The system of claim 65, wherein:
each traffic sliding sectional fingerprint is based on a hash function computed on a corresponding one of the overlapping traffic contiguous token sections.

67. The system of claim 55, wherein:
the classification is the private classification as a result of the file not being successfully accessed by the discovery agent software.

* * * * *